United States Patent
Simon

(10) Patent No.: US 6,604,386 B2
(45) Date of Patent: Aug. 12, 2003

(54) CONTROL FOR AN I.S. MACHINE

(75) Inventor: Jonathan S. Simon, Pleasant Valley, CT (US)

(73) Assignee: Emhart Glass, S.A., Cham (CH)

( * ) Notice: Subject to any disclaimer, the term of this patent is extended or adjusted under 35 U.S.C. 154(b) by 280 days.

(21) Appl. No.: 09/829,746

(22) Filed: Apr. 10, 2001

(65) Prior Publication Data

US 2002/0189293 A1 Dec. 19, 2002

(51) Int. Cl.$^7$ .................................................. C03B 9/41
(52) U.S. Cl. .............................. 65/163; 65/159; 65/164; 65/DIG. 13; 700/28; 700/100; 700/158; 700/182; 700/184
(58) Field of Search ............................. 65/29.1, 29.11, 65/158, 159, 160, 163, 164, DIG. 13; 700/28, 100, 158, 182, 184

(56) References Cited

U.S. PATENT DOCUMENTS

| | | | |
|---|---|---|---|
| 3,762,907 A | | 10/1973 | Quinn et al. .................... 65/164 |
| 3,877,915 A | * | 4/1975 | Mylchreest et al. ......... 65/29.11 |
| 3,899,915 A | | 8/1975 | Williams, Jr. et al. ........ 73/1.13 |
| RE29,188 E | * | 4/1977 | Croughwell .................. 65/163 |
| 4,369,052 A | | 1/1983 | Hotmer ......................... 65/160 |
| 4,615,723 A | * | 10/1986 | Rodriguez-Fernandez et al. .............................. 65/163 |
| 4,623,375 A | * | 11/1986 | Cardenas-Franco et al. .. 65/163 |
| 4,783,746 A | * | 11/1988 | Cardenas-Franco .......... 700/158 |
| 5,345,389 A | * | 9/1994 | Calvin et al. ................. 700/158 |
| 5,486,995 A | * | 1/1996 | Krist et al. .................... 700/29 |
| 5,726,878 A | * | 3/1998 | Nakamura et al. ............. 700/44 |

FOREIGN PATENT DOCUMENTS

JP          0748130        2/1995

* cited by examiner

Primary Examiner—Sean Vincent
(74) Attorney, Agent, or Firm—Spencer T. Smith

(57) ABSTRACT

A control for defining data for setting the times for controlled events in a glass forming machine which is controlled by a programmable sequencer which defines the time of a machine cycle. The control includes a computerized model of a mathematical representation of a network constraint diagram of the unwrapped bottle forming process which takes more than two machine cycles to complete and a computer for analyzing the computerized model as a constrained optimization problem for determining, with the following data inputs:

1. the motion durations,
2. the submotion durations,
3, the machine cycle time,
4. the event time for each displacement to begin and for each valve to be turned "on" and "off", and
5. the thermal forming process durations, whether there is a feasible optimized schedule and the machine cycle time and the event time for each displacement to begin and for each valve to be turned "on" and "off".

8 Claims, 21 Drawing Sheets

FIG. 11

|  | EVENTS | G ON | H OFF |
|---|---|---|---|
| 1 | EVENTS | ON | OFF |
| 2 | GOB INTERCEPTOR | 334 | 14 |
| 3 | BLANKS CLOSE | 324 | 130 |
| 4 | BLANKS OPEN | 130 | 321 |
| 5 | PLUNGER UP | 33 | 123 |
| 6 | FIRST BAFFLE | 9 | 125 |
| 7 | PLUNGER DOWN | 127 | 327 |
| 8 | FUNNEL | 1 | 150 |
| 9 | SETTLE BLOW | 1 | 1 |
| 10 | PLUNGER COOLING | 150 | 260 |
| 11 | INVERT | 200 | 260 |
| 12 | NECKRING OPEN | 274.5 | 283 |
| 13 | REVERT | 282 | 172 |
| 14 | MOLDS CLOSE/OPEN | 229 | 170 |
| 15 | MOLD COOLING | 10 | 150 |
| 16 | FLOWHEAD | 290 | 113 |
| 17 | FINAL BLOW | 348 | 120 |
| 18 | TAKE OUT IN | 137 | 197 |
| 19 | TONGS CLOSE | 178 | 78 |
| 20 | TAKE OUT OUT | 197 | 90 |

CONTROL FOR AN I.S. MACHINE

The present invention relates to an I.S. (individual section) machine and more specifically to a control for such a machine.

BACKGROUND OF THE INVENTION

The first I.S. machine was patented in U.S. Pat. No. 1,843,159, dated Feb. 2, 1932, and U.S. Pat. No. 1,911,119, dated May 23, 1933. An I.S. (individual section) machine has a plurality of identical sections. Each section has a frame on which are mounted a number of section mechanisms including blank side and blow side mold open and close mechanisms, an invert and neck ring mechanism, a baffle mechanism, a blowhead mechanism, a plunger mechanism and a takeout mechanism. Associated with these mechanisms is process air used for cooling, for example. Each of the section mechanisms and the process air have to be operated at a selected time in the section cycle.

In the original I.S. machine, devices (valves which operated the mechanisms and the process air, for example) had to be mechanically turned on and off each cycle and the timing process was controlled by a 360° timing drum which was a cylindrical drum having a number of annular grooves, one for each valve, each supporting "on" and "off" dogs for tripping a corresponding switch associated with a particular valve. The rotation of this mechanical timing drum through 360° has always been equated to the completion of one control cycle of the machine or section and accordingly men skilled in this art have always analyzed machine performance in a wrapped cycle, i.e., one that repeatedly cycles from 0° to 360°. When electronic timing replaced the mechanical timing drum, devices were turned on and off by an electronic sequencer which replicated the wrapped 360° control cycle of the mechanical timing drum. An encoder defined the angular location of the electronic sequencer, and electronic switches were turned on and off at the same angles as was the case with a mechanical timing drum. A very significant development that greatly enhanced the power of the electronic sequencer was the concept of thermodynamic modes (U.S. Pat. No. 3,877,915) wherein groups of these electronic switches were linked so that they could be simultaneously adjusted. These machine controllers allow the user to electronically adjust the on/off schedule (angle) for the various valves which operate the section mechanisms. This conventional approach does not allow an operator to directly command the machine to achieve desired forming durations (e.g. blank contact time, reheat time). It also does not prevent the user from setting invalid or even potentially damaging sequences in which the mechanisms collide. Only with considerable experience, and process insight can an operator effectively adjust the machine timing with the conventional approach and since skill levels vary greatly, the productivity of the machine can vary substantially.

OBJECT OF THE INVENTION

It is an object of the present invention to provide an improved control system for a glass forming machine which will simplify machine operation and facilitate the tuning of the machine for higher productivity.

Other objects and advantages of the present invention will become apparent from the following portion of this specification and from the accompanying drawings which illustrate a presently preferred embodiment incorporating the principles of the invention.

BRIEF DESCRIPTION OF THE DRAWINGS

FIG. 11 is an event timing chart for a 360° electronic sequencer which controls a section of an I.S. machine;

BRIEF DESCRIPTION OF THE PREFERRED EMBODIMENT

Figure 1:
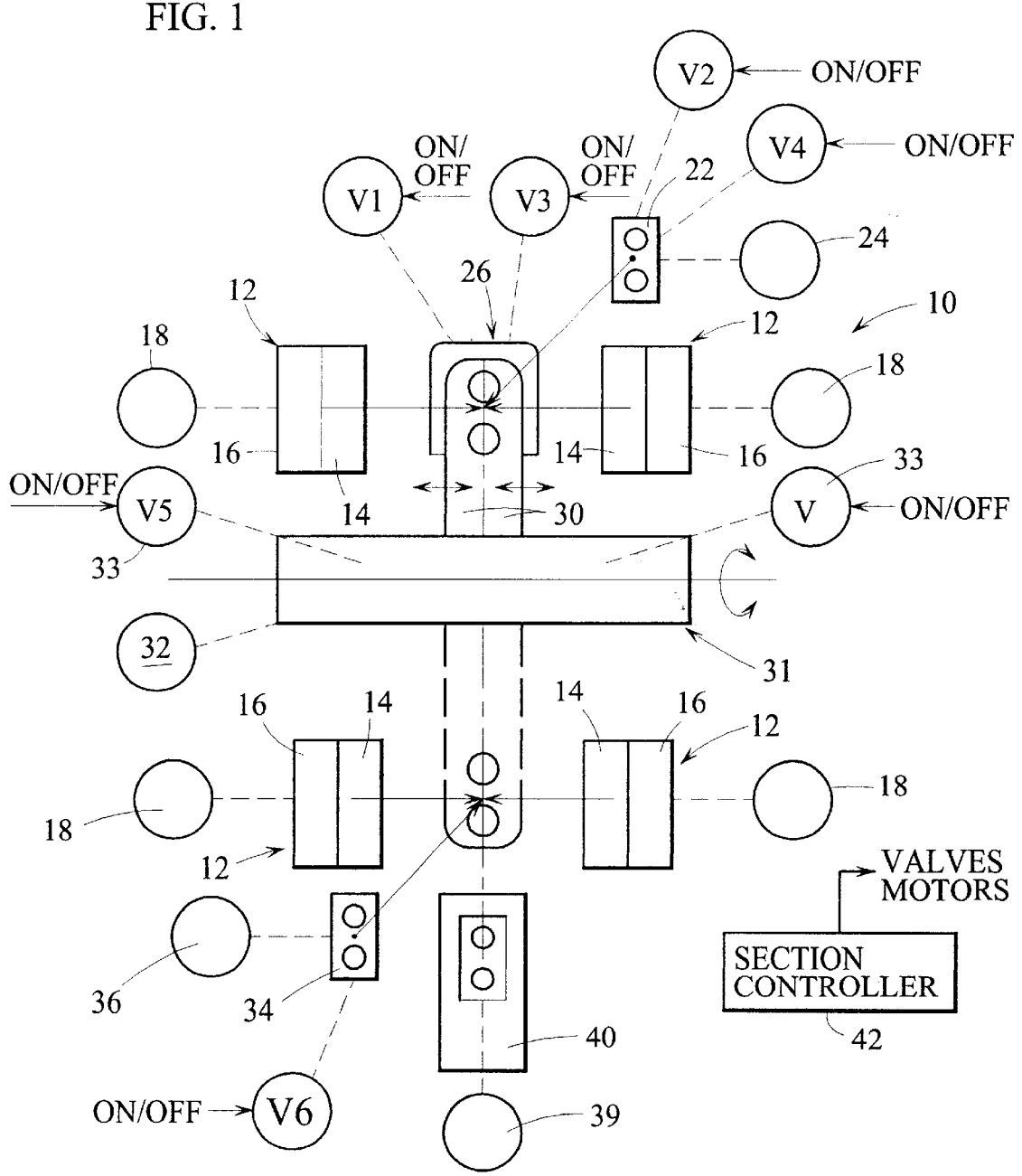
FIG. 1 is a schematic illustration of one section of an I.S. machine which can have one or more of such sections.

An I.S. machine includes a plurality (usually 6, 8, 10, or 12) of sections 10. Each section has a blank station including a mold opening and closing mechanism 12 having opposed mold supports 14 which carry blank mold halves. When these mold supports are closed by a suitable displacement mechanism 16 which can displace the mold support between open (illustrated) and closed positions and which is displaced by a motor 18 such as a servo motor, discrete gobs of molten glass can be delivered to the closed blank mold. The open top of the blank mold will then be closed by a baffle of a baffle support 22 which is displaceable between remote and advanced positions by a motor (such as a servo) 24. If the section is operating in the press and blow mode, the plunger of a plunger mechanism 26 is advanced vertically upwardly into the gob to form the parison. Cooling air will be supplied to the plunger via a valve V1. If the section is operating in the blow and blow mode, the finish is formed by applying settle blow air through a valve V2 in the baffle mechanism 22, and the parison is formed with the application of counterblow air to the plunger via a valve V3, while vacuum is applied to the baffle through a valve V4.

After the parison is formed, the baffle support is retracted, the mold supports are retracted and a pair of neck ring holder arms 30 which are rotatively supported by an invert mechanism 31, will be rotated 180° by a servomotor drive 32. The blank station also includes a mold opening and closing mechanism 12 having opposed mold supports 14 which carry blow mold halves. These mold supports are displaced between open and closed positions by a suitable displacement mechanism 16 which is displaced by a motor 18 such as a servo motor. With the parison located at the blow station, the mold supports are closed, the neck ring arms are opened to release the parison (each arm is displaceable by a pneumatic cylinder (not shown) which is operated with a suitable valve V5), the invert mechanism returns the neck ring arms to the blank side (the arms close prior to arrival) and a blow head support 34 which is displaceable between a retracted position and an advanced position where a supported blowhead closes the blow mold, is displaced to the advanced position by a suitable motor such as a servo 36 to blow the parison into the bottle. This final blow is controlled by a valve V6.

When the bottle is formed, the blowhead is retracted, blank molds are opened and a takeout mechanism 38 which is driven by a suitable motor 39, such as a servo motor, is displaced to pick up the formed bottle and carry it to a location above a deadplate 40 where it is cooled while suspended and then deposited onto the deadplate. In addition to the movement of mechanisms and devices, process air to mechanisms, moveable or stationary, may also be controlled. When the blow molds are closed, mold cooling air is turned on to cool the formed bottle.

Each section is controlled by a computer 42 which operates under the control of a 360 degree timing drum (programmable sequencer) which defines a finite number of angular increments around the drum at which mechanisms, etc., can be turned on and off each 360 degree rotation. The control knows the time it takes for rotating 360 degrees and this time can be fixed or defined as the duration between once per cycle pulses such as pulses originating from the feeder of the I.S. machine. Each valve is cycled (turned on and off) and each mechanism is cycled within the time of one machine cycle by an electronic timing drum (programmable sequencer) which is part of the computer 42.

In accordance with the present invention a tool is defined first by making an unwrapped cycle constraint diagram for an actual I.S. machine configuration and then making a mathematical representation of the unwrapped cycle constraint diagram that is capable of automated formulation and solution. "Unwrapped" means the I.S. is a process cycle beginning with the formation of a gob of molten glass by severing the gob from a runner of molten glass and ending with the removal of a formed bottle from the blow station. This process cycle takes more than one 360° machine cycle of the timing drum to complete (normally 2 times 360° machine cycles).

FIGS. 2–9 show a possible Network Constraint Diagram for a representative blow and blow process for making glass bottles in an I.S. machine. The cycle starts with the shear cut represented by time node z1 ("z" and "n" denote a time node). Gob Delivery/M13 (a block containing an "M" represents an activity that will move between start and end positions with the direction of motion being indicated with arrows) begins at z1 and ends with n177/e26/n6 (a vertically oriented equal sign labeled "e" connecting two nodes indicates that the two connected nodes occur at the same time). Gob Delivery/M13 motion is subdivided into two submotions: 1. Gob In Collision Zone With Baffle/m2 (a block containing a "m" represents a submotion) which starts at z1/e1/n3 and ends at n4. Gob Traverses Blank Mold/m3 which starts at n4/e2/n5 and ends at n6.

Figure 9:
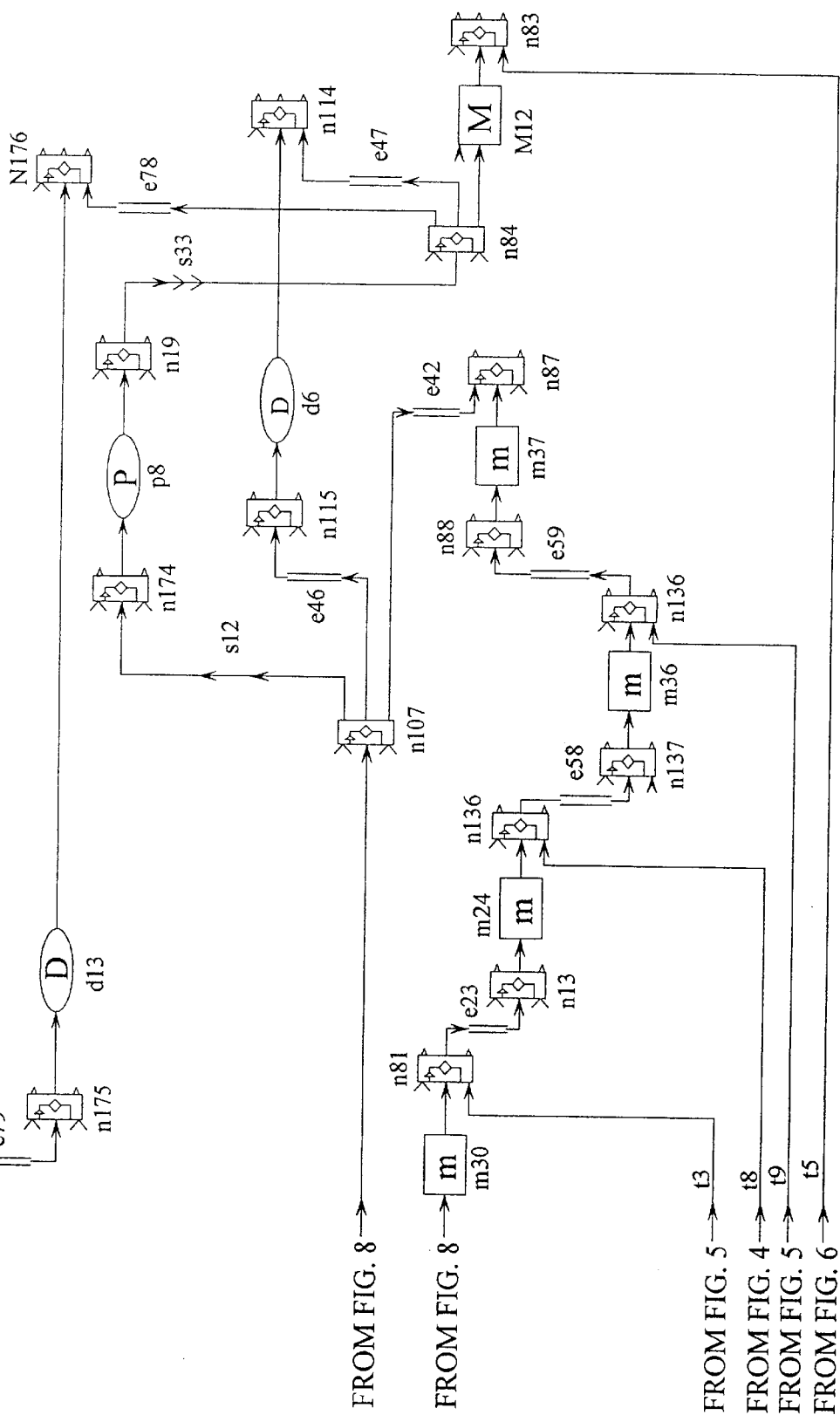
FIG. 9 is the eighth part of the Network Constraint Diagram for the Blow and Blow process.

Node z1 (shear cut) also has another branch Total Process/ d13 which starts at z1/e79/n175 and ends at n176/e78/n84 (FIG. 9). Derived branches are identified with ellipses containing "D" and represent thermal process durations that are defined as a function of the machine events.

Figure 2:
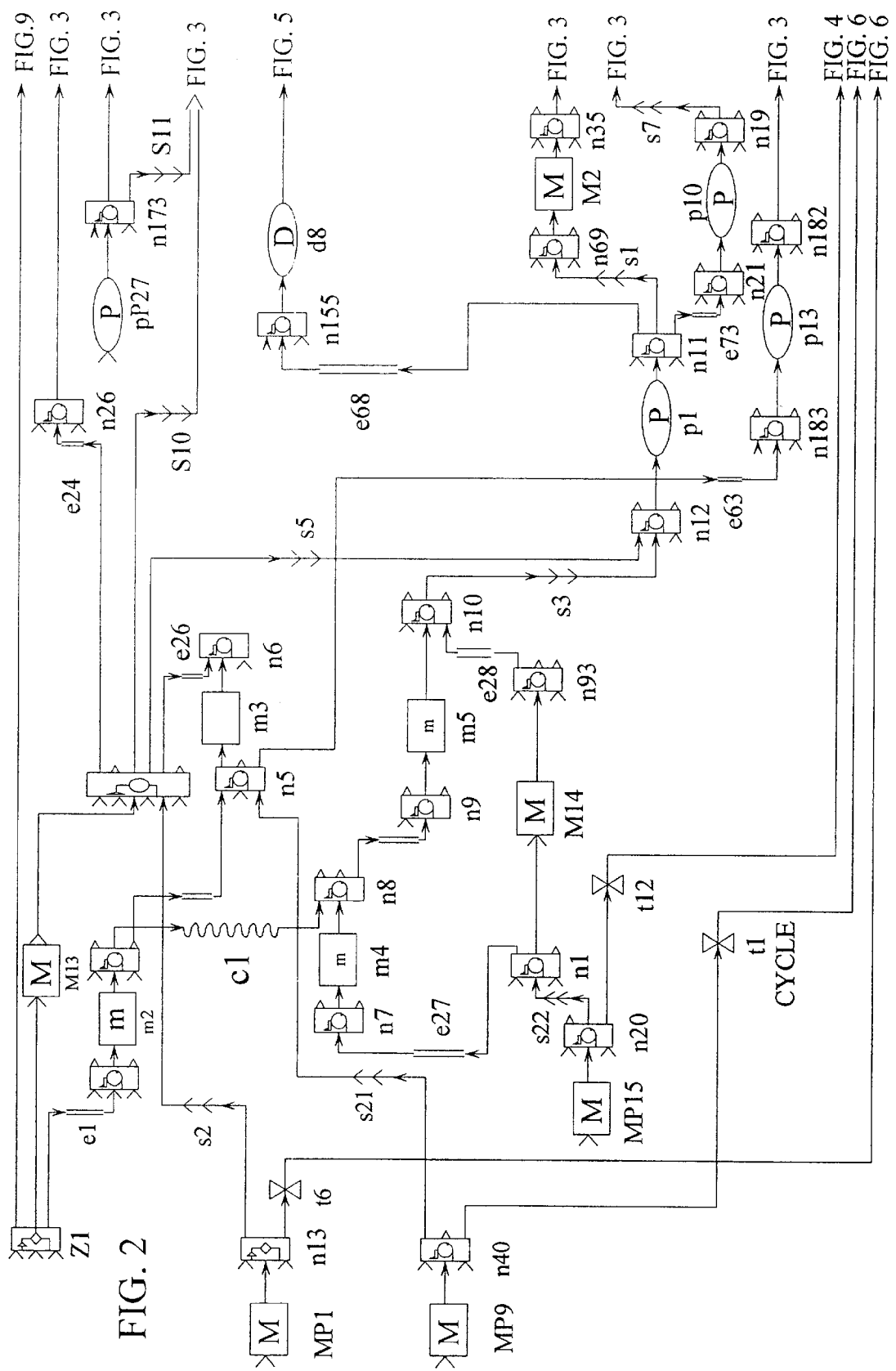
FIG. 2 is the first part of the Network Constraint Diagram for the Blow and Blow process.
Figure 3:
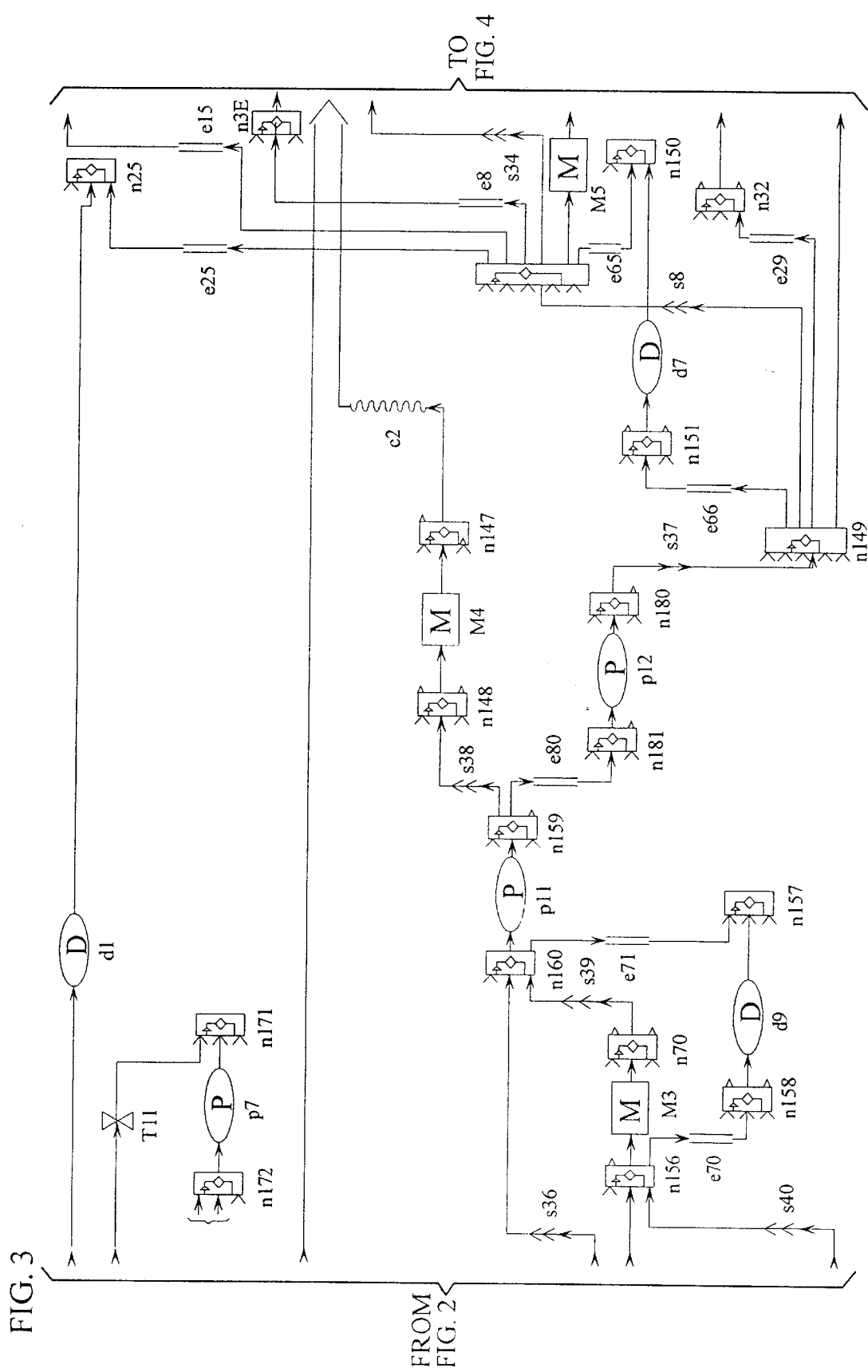
FIG. 3 is the second part of the Network Constraint Diagram for the Blow and Blow process.
Figure 4:
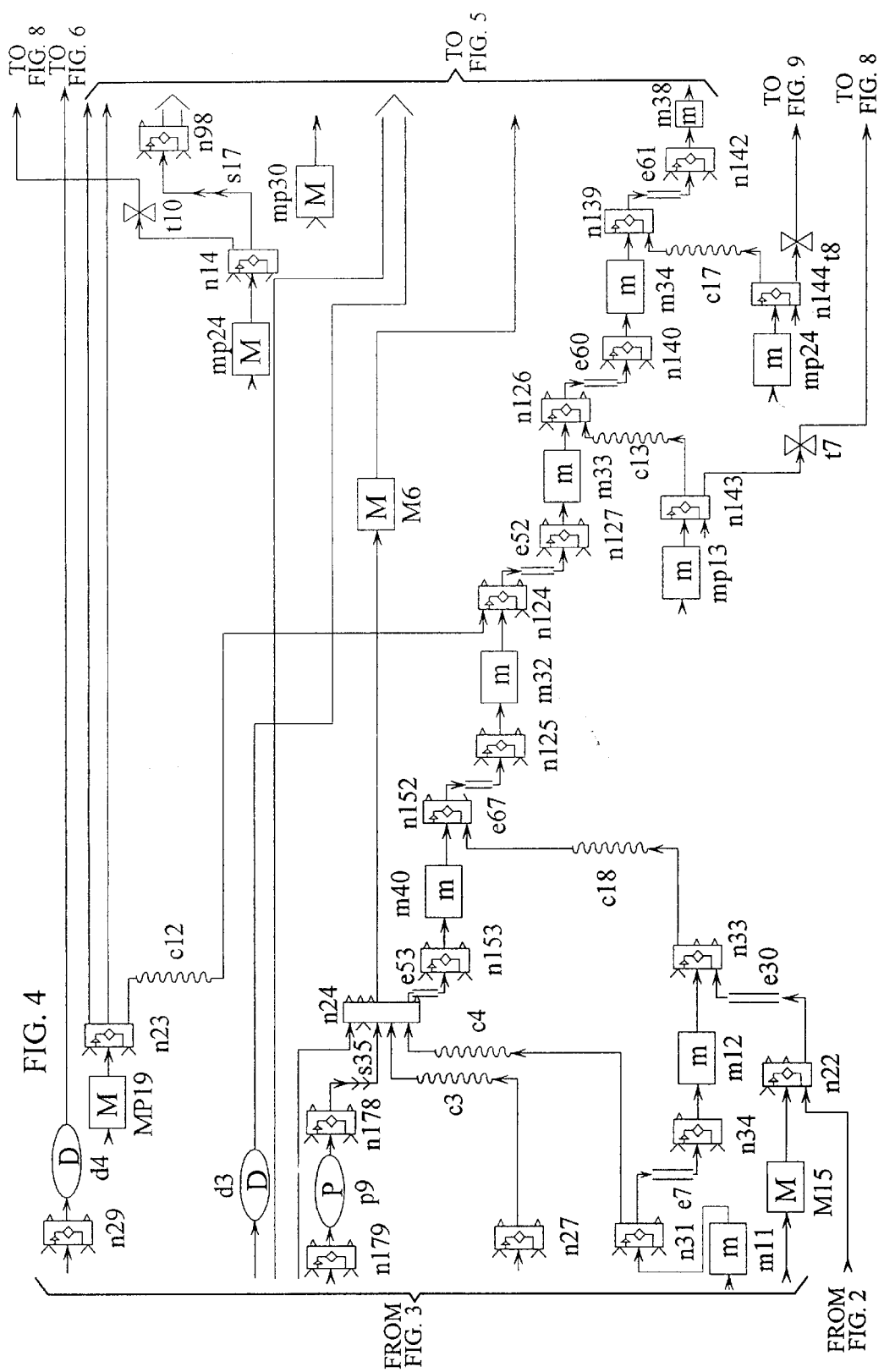
FIG. 4 is the third part of the Network Constraint Diagram for the Blow and Blow process.

FIG. 2 also shows that Plunger To Loading Position/MP1 ("P" means prior cycle) must be completed at n13. Node n13 is the time when the motion Plunger To Loading Position/ M1 was completed at n15 during the prior cycle. This is indicated by cycle time branch (FIG. 6) that connects n13 to n15. The plunger includes an independently moveable thimble and at the end of Plunger To Loading Position/M1, both the thimble and the plunger are up. Node n177, the end of Gob Delivery/M13 must be some time (s2) ("s" along side a pair of closely adjacent direction arrows represents some time (a sequence constraint) that will pass between connected nodes) after n13.

FIG. 2 also shows node n20 which is the time when Baffle Off/MP15 was completed in the previous cycle t2. This is indicated by cycle time branch t2 that is connected to node n22 (FIG. 4) which is the time when Baffle Off/M15 is completed in the subsequent cycle. Node n20 is connected to n1 which starts Baffle On/M14 some time (s22) after n20, i.e., Baffle On/M14 cannot start until Baffle Off/15 is completed. Motion branch Baffle On/M14 ends at node n93. Baffle motion is broken down into submotions Baffle Moves To Interference With Gob/m4 which starts at n1/e27/n7 and ends at n8 and Baffle On Completion/m5 which starts at n8/e3/n9 and ends at n10/e28/n93. Also shown is collision branch Baffle Collides With Gob/c1 (collision branches are represented by a squiggly line which is identified by "c") connecting node n4 to n8. This means that the gob must be at n4 before or no later than the baffle reaches n8 in order to be sure that no collision will occur.

FIG. 2 also shows node n40 which is the time Blank Molds Closed/MP9 the last cycle (n40 is connected to node n55 (FIG. 6) which is the end of Blank Molds Closed/M9 the present cycle with t1 indicating a cycle difference). Blank Molds Closed/MP9 was complete at n40 which is some time (s2) before the start of Gob Traverses Blank/m3 at n5.

When the gob is fully delivered in the blanks n177/e24/ n26 Blank Contact/d1 (FIG. 3) begins and continues until n25/e25/n28 when the Blanks Open/M5. Prior to Blank Contact/d1 at time n5/e63/n183 (the time when Gob Traverses Blank/m3 begins) a vacuum valve is opened starting the process branch Vacuum Assist/p13 (process branches are identified with ellipses containing "P"). Vacuum Assist/p13 will continue until n182 when the vacuum valve will be closed. This means that at the same time that the gob is traversing the blank, vacuum is being applied through the neck ring (before completion of the plunger moving to the loading position) to help draw the gob into the neck area of the blank and into the neck ring.

Figure 5:
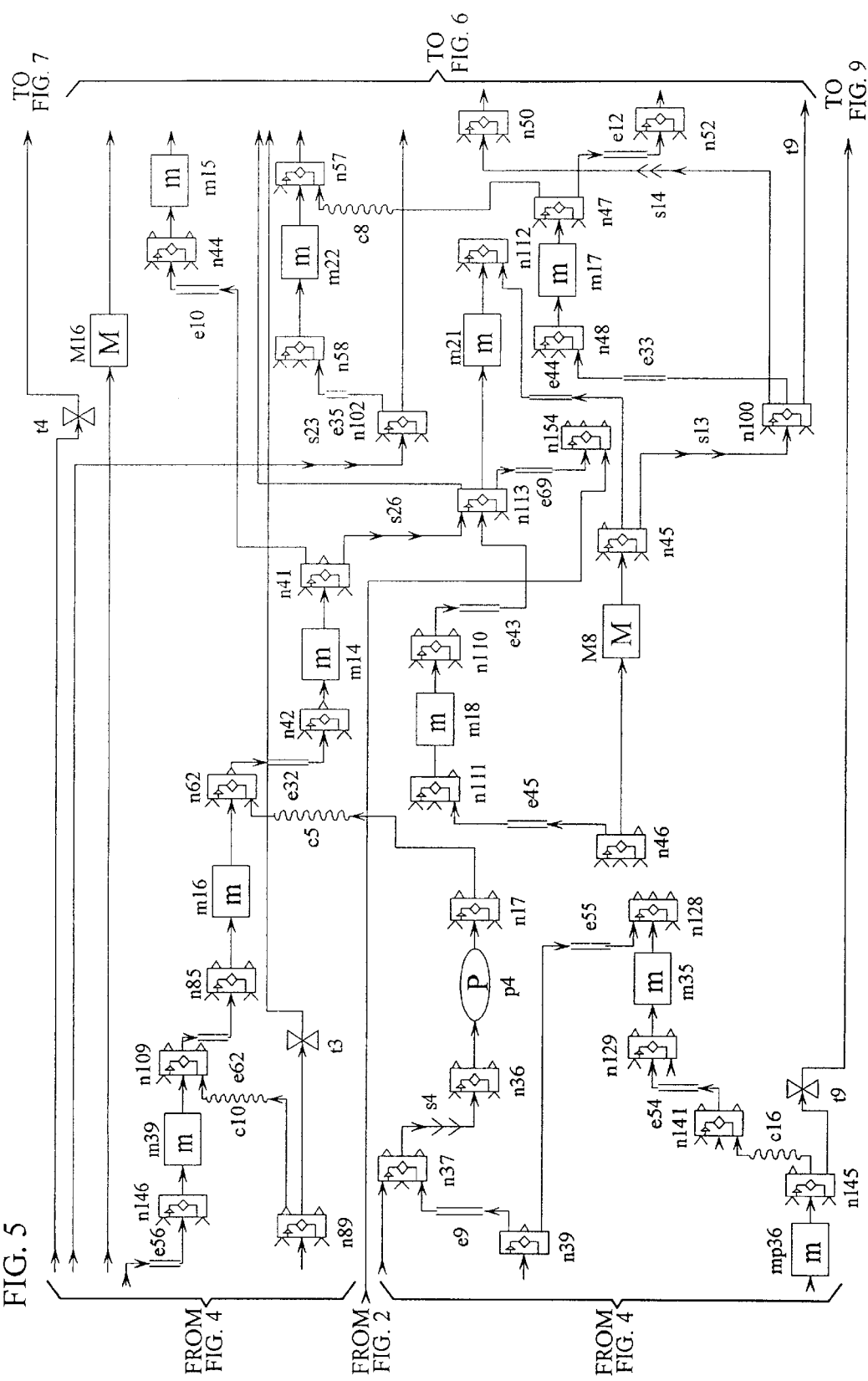
FIG. 5 is the fourth part of the Network Constraint Diagram for the Blow and Blow process.

At n12 which is some time (s5) after the gob is delivered (n177) and some time (s3) after the baffle is on (n10), a compressed air valve is opened to start Settle Blow/p1 which ends at node n11/e73/n21/e68/n155 with the closing of the compressed air valve. When Settle Blow/p1 ends Settle Blow Vent/p10 begins and ends at n19 and Neck Ring Contact/d8 begins and ends at n154/e69/n113/ with Neck Rings Opening/m21 (FIG. 5). This means that at the completion of settle blow the gob is in contact with the neck ring and heat is being removed from the gob until the neck rings are opened. Baffle To Down/M2 (FIG. 2) begins at n69, which is some time (s1) after n11 and ends at n35 (closes top of blank for counter blow). At n172 (FIG. 3) which is some time s10 after n177 when the gob is fully loaded into the blank molds and another time s11 after Blank Cooling/pP7 ended at n173 during the last cycle (t11), Blank Cooling/p7 begins with the opening of a valve and continues until n171 when the valve is closed.

At n156 (FIG. 3), which is time s40 after Vacuum Assist/p13 ends at n182 and which is time s7 after n19 when Settle Blow Vent/p10 is over, the Plunger Is Displaced To Counter Blow Position/M3 (the thimble is retracted out of the glass), a process that ends at n70 and at the same time (n156/e70/n158) the glass in the area of the finish, which is in complete contact with the molds, will reheat (Corkage Reheat/d9) until n157/e71/n160 which is some time (s39) after n70 and which is some time (s36) after n35 (the end of Baffle To Down/M2. At n160, Counter Blow/p11 starts with the opening of a valve and continues until time n159/e80/n181/ when a valve opening a vent in the baffle is opened to allow the process Counter Blow Vent/p12 to start. This process ends at n180. At time n148, which is some time (s38) after n159, the Plunger (is displaced) To Invert Position/M4 whereat both the thimble and the plunger are down (this takes until n147).

At n149/e66/n151, which is some time (s37) following the end of Counter Blow Vent/p12 at n180, the following events begin simultaneously: 1. Parison Bottom Reheat/d7 which lasts until n150/e65/n28 and 2. Baffle Off/M15 (FIG. 4) which lasts until n22/e30/n33. Baffle Off/M15 can be divided into two submotions; the first being Baffle Off Clears Interference With Invert/m11 which begins at n149/e29/n32 (FIG. 3) and ends at n31/e7/n34, and the second being Baffle Off Completion (past interference)/m12 which starts at n34 and ends at n33. At n28 (FIG. 3), which is some time (s8) after n149, the following events simultaneously occur: 1. Blanks Open (blank molds are opened)/M5 which ends at n27 (FIG. 4) leaving the bottom of the parison on the bottom plate of the blank molds; 2. Reheat (parison)/d4 begins at time n28/e15/n29 (FIG. 4) and continues until n61/e16/n30 (FIG. 6) (some time (s15) after Blow Head On/M18 movement is completed at n10) when Final Blow/p2 (FIG. 7) begins, ending at n63; and Inverted Reheat/d3 which begins at n28/e8/n38 (FIG. 3) and continues until n37/e9/n39 (FIG. 5) which corresponds to the completion of Invert/M6 which began at n24. At n36 (FIG. 5), some time (s4) following n37, reheat will continue with the parison inverted (Parison Invert Recovery/p4) until n17. The invert motion is subdivided into a number of submotions. At the beginning of invert displacement (n24/e53/n153) (FIG. 4), there is the submotion Invert To Baffle Interference/m40 which ends at time n152/e67/n125. The next submotion is Invert Baffle Interference To Invert Blowhead Interference/m32 which ends at time n124/e52/n127. The next submotion is Invert To Takeout Interference1 From Blowhead Interference/m3 which ends at n126/e60/n140 when Invert (moves) To Takeout Interference2/m33 begins ending at n139/e61/n142. The next submotion is Invert (moves) To Takeout Interference3/m38 which begins at n142 and ends at n141/e541n129. Finally Invert Completion/m35 (FIG. 5) occurs beginning at N129 and ending at n128/e55/n39.

A number of collision branches are identified. Plunger Collides With Invert/c2 (FIG. 3) when the plunger M4 is not displaced to the invert position before the invert moves (time n147 vs. time n24). Blanks Collide With Invert/c3 (FIG. 4) when the blanks MS are not displaced to the open position before the invert moves (time n27 vs. time n24). A number of other collisions are shown: Baffle Collides With Invert/c4 when the baffle m11 reaches a selected point before n24 and Baffle Collides With Invert/c18 when the baffle m11 reaches its fully off position before n152 when the invert has reached the outer limits of its interference zone with the baffle. By dividing the interference zone into more than one zones, the mechanism can get an earlier start. The blow head and the invert will collide c12 if Blow Head Up MP19 has not occurred (the last cycle t4) before the invert has reached the end of the Invert Baffle Interference To Invert Blowhead Interference (time n23 vs. time n124).

Also shown is the motion of the takeout: Takeout Through Interference1/mp13 (FIG. 4) which ends at n143 (the last cycle/t7); Takeout Through Interference2/mp24 which ends at n144 (the last cycle/t8); and Takeout Through Interference3/mp36 (FIG. 5) which ends at n145 (the last cycle/t9). A number of collisions are identified: Takeout Collides With Invert/c13 (FIG. 4) if the invert reaches Interference1 before the takeout does (n143 vs. n126). Takeout Collides With Invert/c17 if the invert reaches Interference2 before the takeout does (n144 vs. n139). Takeout Collides With Invert/c16 (FIG. 5) if the invert reaches Interference3 before the takeout does (n141 vs. n145). At n179 (FIG. 4) which is some time (s34) after n28, Neck Ring Cooling/p9 begins with the opening of a valve and continues until n178, which is some time s35 before n24 when the invert/M6 begins to move.

Figure 6:
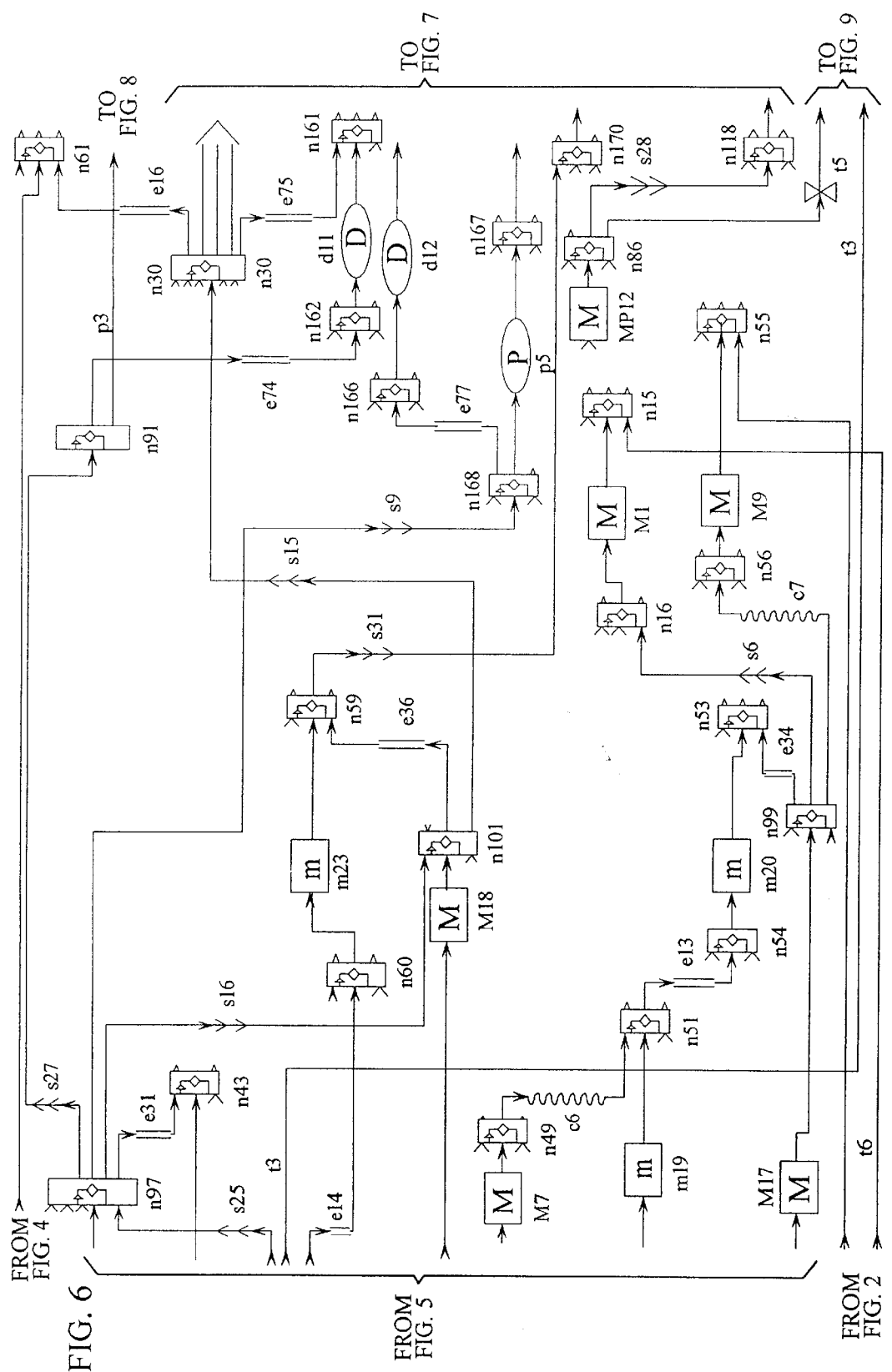
FIG. 6 is the fifth part of the Network Constraint Diagram for the Blow and Blow process.
Figure 7:
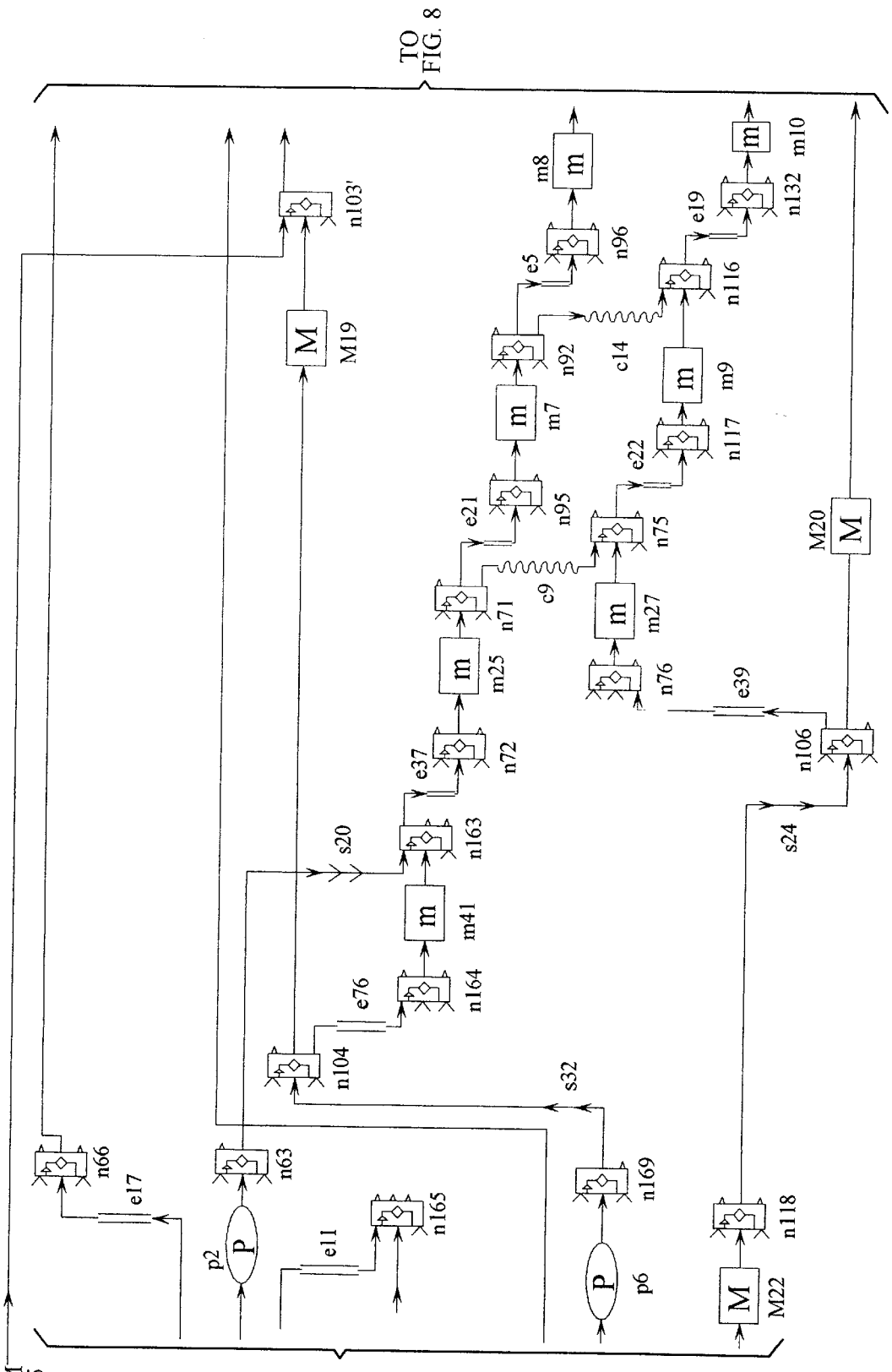
FIG. 7 is the sixth part of the Network Constraint Diagram for the Blow and Blow process.

The blow molds, which were open Mp24 (FIG. 4) at time n14 during the last cycle t10, begin to close at time n98/e56/n146 which is some time (s17) after n14. Closing has a number of submotions: Molds Close to Ware Width/m39 (FIG. 5) which starts at n146 and ends at n109/e62/n85; Molds Close To Parison Width/m16 which starts at n85 and ends at n62/e32/n42; Molds Close to Receive Position/m14 which starts at n42 and ends at n41/e10/n44; and Molds Close Shut/m15 which starts at n44 and ends at n43/e31/n97 (FIG. 6). Takeout Clears Ware From Mold/Mp30 (FIG. 4) must have operated in the prior cycle t3 before Molds Close To Ware Width/m39 to avoid a collision of the takeout with the molds c10 (time n89 vs. time n109. Furthermore, Parison Invert Recovery/p4 should be complete before the molds close (time n17 vs. n62/e32/n42) or a collision Parison Collides With Mold/c5 will occur.

The neck rings open to release the parison at the blow head (Neck Rings Open/M8) (FIG. 5). This motion which occurs from n46 to n45/e44/n112 is divided into two parts: Neck Ring Open Delay/m18 which starts at the same time n46/e45/n111 and ends at n110/e43/n113 (some time (s26) after n41—the end of Molds Close To Receive Position/m14 and some time (s25) before Blow Molds Close/M16 is complete at n97) (FIG. 6) when the second part (Neck Rings Opening/m21) starts. This second part ends at n112. In the event that Neck Rings Closing/M7 (FIG. 6) occurs (n49)

before Revert To Neck Ring/Blank Interference/m19 (n51), the collision Neck Rings Collide With Blank Mold/c6 will occur. At n100 (FIG. 5), which is some time (s13) after the opening of the neck rings (M8) at n45/ the invert is displaced back to its original position (Revert/M17). Revert is complete at n99/e34/n53. Revert has three submotions 1. starting at n100/e33/n48 there is Revert Clears Interference With Blow Head/m17 which ends at n47/e12/n52, 2. following Revert Clears Interference With Blow Head, there is Revert To Neck Ring/Blank Interference/m19 which ends at n51/e13/n54 when 3. Revert Completion/m20 operates ending at n53/e34/n99. At n50 which is some time (s14) after n100, Neck Rings Closing/M7 operates until n49. If the neck rings are not closed before revert reaches its initial location of interference with the blank mold (time n49 vs. n51), the collision Neck Rings Collide With Blank Mold/c6 will occur.

At time n102 (FIG. 5) which is some time (s23) after n23, the movement Blow Head On/M18 (FIG. 6) takes place finishing at n101/e36/n59. This is a two stage displacement beginning with Blow Head To Interference With Revert/m22 which begins at n102/e35/n58 and ends at n57. In the event that Revert Clears Interference With Blow Head does not occur before Blow Head To Interference With Revert, Revert Collides With Blow Head/c8 will occur (n57 vs. n47). The last portion of the blow head displacement is Blow head On Completion/m23 which begins at n57/e14/n60 and ends at n59.

At n56 Blanks Close/M9 (FIG. 6) begins and continues until n55. If the completion of Revert/M17 at n99 does not preceed the start of Blanks Close/M9 at n56 the Revert Collides With Blank Molds/c7 collision will occur. At n16 which is some time (s6) after n99, the Plunger To Loading Position/M1 displacement takes place ending at n15.

n30/e17/n66 (FIG. 7) is the beginning of Mold Contact/d5 (FIG. 8) which ends at n65/e18/n68 and Final Blow/p2 which ends at n63. n30/e11/n165 is also the end of Vacuum Blow Lead/d12 which begins at n166/e77/n168. Also beginning at n168 is Vacuum Blow/p5 which ends at n167 which is some time (s29) before n68/e18/n65 (FIG. 8) which is the end of Mold Contact/d5. Both Vacuum Blow Lead/d12 and Vacuum Blow/p5 begin at n168/e77/n166 (FIG. 6) which is some time (s9) after n97. At n91 which is some time (s27) following the end of Blow Molds Close/M16 at n97, Blow Mold Cooling/p3 (FIG. 8) begins continuing until n90 which is some time (s30) before the end (n65/e18/n68) of Mold Contact/d5. Additionally Blow Mold Precooling/d11 (FIG. 6) begins at the same time n91/e74/n162 and continues until n161/e75/n30/e16/n61 which is also the end of Reheat/d4. Finish Cooling/p6 (FIG. 7) begins at n170 which is some time (s31) after the end of the end of Blow Head On/M18 at n101 and ends at n169.

At n104 (FIG. 7) which is some time (s32) after the end of Finish Cooling/p6 at n169, Blow Head Up/M19 begins ending at n103/e38/n73. This movement can be broken down into a number of submotions: 1. Blow Head Up To End Final Blow/m41 which begins at n104/e76/n164 and ends at n163 which is some time (s20) ahead of n63 (the end of Final Blow/p2), 2. Blow Head Clears Interference1 With Takeout/m25 which begins at n163/e37/n72 and ends at n71, 3. Blow Head Up Clears Interference2 With Takeout/m7 which begins at n71/e21/n95 and ends at n92, 4. Blow Head Up Clears Interference3 With Takeout/m8 which begins at n92/e5/n96 and ends at n94 (FIG. 8), and 5. Blow Head Up Completion/m26 which begins at n94/e6/n74 and ends at n73.

Figure 8:
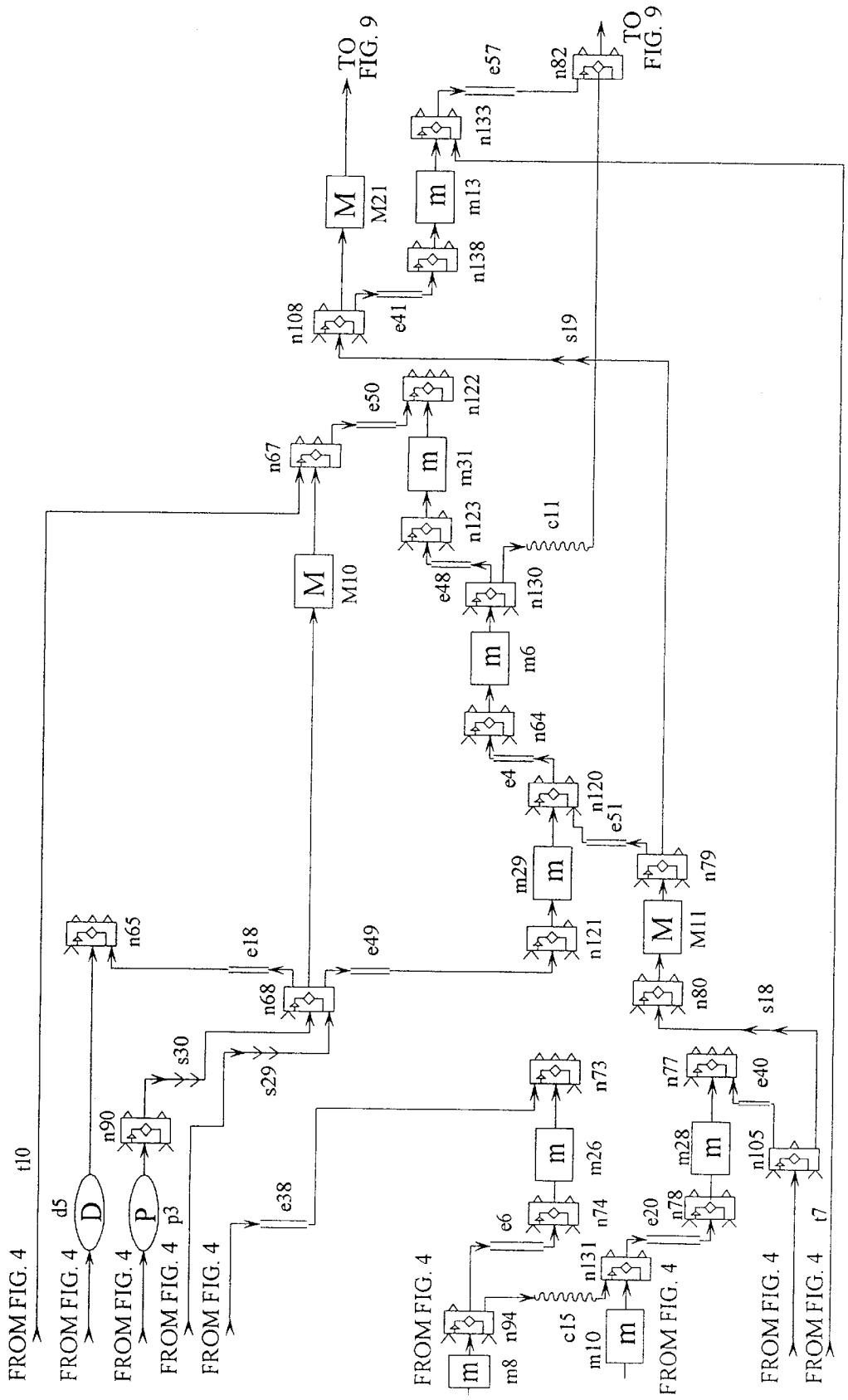
FIG. 8 is the seventh part of the Network Constraint Diagram for the Blow and Blow process.

Tongs Open/MP12 (FIG. 6) is complete at n86 (of the prior cycle t5) and some time (s28) thereafter, at n119, Kickback (takeout ready position)/M22 begins and ends at n118. At n106, which is some time (s24) after n118, Takeout In/M20 begins ending at n105. Takeout movement has a number of sub movements: 1. Takeout In To Interference1 With Blow Head/m27 which begins at n106/e39/n76 and ends at n75, 2. Takeout In To Interference2 With Blowhead/m9 which begins at n75/e22/n117 and ends at n116, 3. Takeout To Interference3 With Blowhead/m10 which begins at n116/e19/n132 and ends at n131 and 4. Takeout In Completion/m28 which begins at n131/e20/n78 and ends at n77/e40/n105 (FIG. 8). A number of collisions are identified: 1. Blow Head Collides With Takeout/c9 which will occur if n75 occurs before n71, 2. Blow Head Collides With Takeout/c14 if n116 occurs before n92, and 3. Blow Head Collides With Takeout/c15 (FIG. 8) if n131 occurs before n94. At n80 which is some time (s18) after n105 (the end of Takeout In/M20) Tongs Close/M11 finishing at n79/e51/n120. Beginning at n68 and ending at n67/e50/n122 Blank Molds Open/M10. This motion has a number of submotions: 1. Molds Open To Release Point/m29 which begins at n68/e49/n121 and ends at n120/e4/n64, 2. Molds Open To Clear Ware/m6 which begins at n64 and ends at n130/e48/n123, and 3. Molds Open Completion/m31 which begins at n123 and ends at n122/e50/n67. At n108, which is some time (s19) after n79, the end of Tongs Close/M11, Takeout Out/M21 takes place ending at n107 (FIG. 9). This motion also has a number of sub motions: 1. Takeout Out Through Interference1/m13 which begins at n108/e41/n138 and ends at n133, 2. Takeout Clears Ware From Mold/m30 (FIG. 9) which begins at n133/e57/n82 and ends at n81, 3. Takeout Out Through Interference2/m24 which begins at n81/e23/n135 and ends at n13, 4. Takeout Out Through Interference3/m36 which begins at n13/e58/n137 and ands at n136, and 5. Takeout Out Completion/m37 which starts at n136/e59/n88 and ends at n87/e42/n107. The collision Molds Collide With Takeout/c11 will occur if n82 occurs before n130.

Finally at the end of Takeout Out/M21 (n107/e46/n115) Hanging Dead Plate Cooling/d6 takes place until n114. At n174 which is some time (s12) after n107, Dead Plate High/p8 takes place lasting until n18. Some time (s33) thereafter, at n84/e78/n176/e47/n114 Total Process/d13 ends, Hanging Dead Plate Cooling/d6 ends and Tongs Open/M12 ending at n83.

While, for illustrative purposes, one specific blow and blow machine configuration has been described, it should be understood that there are a number of operating configurations which machine users use including blow and blow and press and blow and for each users have developed many unique processes that would vary slightly one from another. A person skilled in this art, with an understanding of the illustrated configuration, should be able to define a constraint diagram for his actual configuration.

The next step is to convert this network constraint diagram into a representation that is ideal for automated formulation and solution of the schedule synthesis and analysis problems by a computer. A matrix algebraic representation of the network constraint model is utilized in the preferred embodiment but other forms of mathematical representations can be used. The Branch Incidence Matrix, F may be formed as follows:

1. Number the branches in the network constraint diagram (NCD) from 1 to $M_b$ where, $M_b$ is the total number of network branches. The ordering of the assigned branch numbers is arbitrary.
2. Number the nodes in the NCD from 1 to $N_n$ where $N_n$ is the total number of network nodes. The ordering of the assigned node numbers is arbitrary.

3. Form the first row of an $M_b$ row by $N_n$ column matrix F by entering a value of 1 (positive one) in the column corresponding to the source node for the first branch, a value of −1 (negative one) in the column corresponding to the destination node for the first branch, and zeroes in all the other columns.

4. Create the second through $M_b$ row of F by repeating the procedure described in Step 3 for the second, third on up to the $M_b$ branch in the network.

The result will be a matrix, F with $M_b$ row by $N_n$ columns which is almost entirely filled with zeros, except for one entry of 1 and one entry of −1 in each row.

Figure 10:
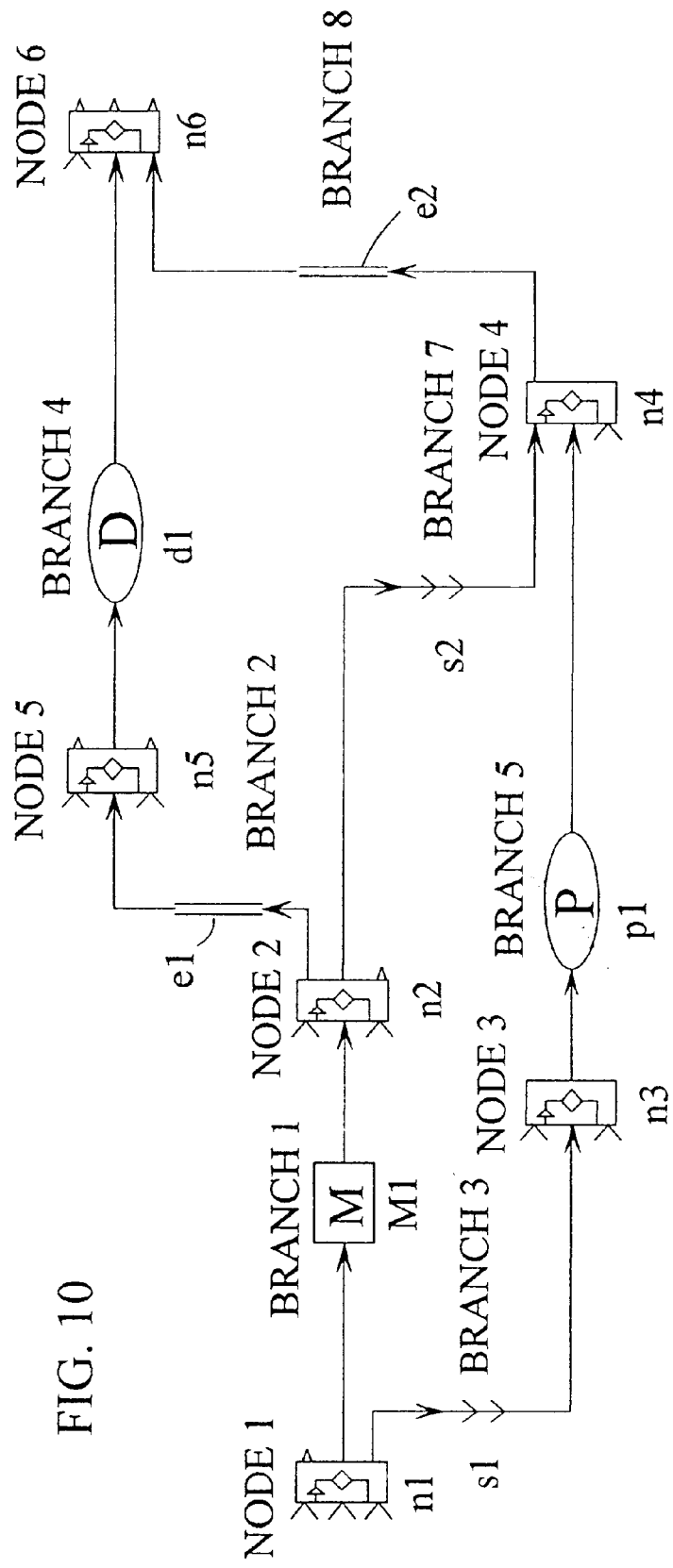
FIG. 10 is network model for branch incidence matrix.

To provide a concrete example, the NCD for a simple network model is shown in FIG. 10. The network has $M_b$=7 branches, and $N_n$=6 nodes. The Branch Incidence Matrix, F for this network will thus have 7 rows and 6 columns. For this model, utilizing the branch and node numbers indicated in FIG. 3, F will then be given by:

$$F = \begin{bmatrix} 1 & -1 & 0 & 0 & 0 & 0 \\ 0 & 1 & 0 & 0 & -1 & 0 \\ 1 & 0 & -1 & 0 & 0 & 0 \\ 0 & 0 & 0 & 0 & 1 & -1 \\ 0 & 0 & 1 & -1 & 0 & 0 \\ 0 & 0 & 0 & 1 & 0 & -1 \\ 0 & 1 & 0 & -1 & 0 & 0 \end{bmatrix} \quad \text{Equation 1}$$

Each branch, i, in the network constraint model represents a pair of relationship of the form:

$$t_{destination,i} - t_{source,i} \leq \delta_{max,i} \quad \text{Equation 2}$$

$$t_{destination,i} - t_{source,i} \geq \delta_{min,i} \quad \text{Equation 3}$$

Where:

$t_{destination,i}$=time assigned to the destination node of the $i^{th}$ branch $t_{source,i}$=time assigned to the source node of the $i^{th}$ branch $\delta_{max,i}$=maximum allowable branch duration for the $i^{th}$ branch $\delta_{min,i}$=minimum allowable branch duration for the $i^{th}$ branch Define the vector t of nodal times, where the $j^{th}$ element of t is the time assigned to the $j^{th}$ network node. Denoting the $i^{th}$ row of the branch incidence matrix F by $F_i$, Equation 2 and Equation 3 can be rewritten as follows:

$$-F_i t \leq \delta_{max,i} \quad \text{Equation 4}$$

$$-F_i t \geq \delta_{min,i} \quad \text{Equation 5}$$

This results from the fact that that the matrix multiplication of the $i^{th}$ row of the constraint matrix,$F_i$, with the nodal time vector, t, selects only the source and destination node times, because all other entries in the row are zero. In accordance with conventional practice a value of positive one is assigned to the element corresponding to a source node and a value of negative one is assigned to the destination node.

Since Equation 3 and Equation 4 hold for each branch in the network the Fundamental Matrix Constraint Equations can be written as follows:

$$-Ft \leq \delta_{max} \quad \text{Equation 6}$$

$$-Ft \geq \delta_{min} \quad \text{Equation 7}$$

For branches that have no upper bound on their duration, $\delta_{max,i}$ is set to positive infinity. Similarly for branches which have no lower bound set on their duration, $\delta_{min,i}$ is set to negative infinity. For branches which must exactly match a target value, both the upper and lower bound are set equal to the target value, $\delta_{target,i}$.

The fundamental matrix constraint equations (Equation 6 and Equation 7) are augmented to account for three types of additional constraints. These three additional types of constraints are:

1. The branch duration for all cycle branches must be equal. This is required to enforce a uniform cycle period on the whole system.
2. The branch duration for each submotion branch must remain a constant fraction of the branch duration for its corresponding main motion branch.
3. The absolute event time for one node in the network must be set to a desired reference value (typically zero).

These requirements can be expressed in terms of the previously defined branch incidence matrix, F as follows:

Each cycle branch must have a duration equal to the cycle period, T, and therefore, regardless of the particular value of the cycle period all $N_t$ cycle branches must have the same branch duration. Denote the branch numbers corresponding to the cycle branches by the set $\{i_1, i_2, \ldots i_{N_t}\}$. The duration of the $k^{th}$ cycle branch can then be expressed as:

$$-F_{i_k} t = \delta_{i_k} \quad \text{Equation 8}$$

Where $F_{i_k}$ represents the $i_k$ row of the Branch Incidence Matrix, F.

The uniform branch duration constraint is then enforced by setting each of the cycle branch durations to be equal to the duration of the first cycle branch as follows:

$$\begin{bmatrix} -F_{i_2} \\ -F_{i_3} \\ \vdots \\ -F_{i_{N_t}} \end{bmatrix} t = \begin{bmatrix} -F_{i_1} \\ -F_{i_1} \\ \vdots \\ -F_{i_1} \end{bmatrix} t \quad \text{Equation 9}$$

Which can be rearranged to obtain:

$$\begin{bmatrix} -F_{i_2} + F_{i_1} \\ -F_{i_3} + F_{i_1} \\ \vdots \\ -F_{i_{N_t}} + F_{i_1} \end{bmatrix} t = \begin{bmatrix} 0 \\ 0 \\ \vdots \\ 0 \end{bmatrix} \quad \text{Equation 10}$$

Defining the matrix $A_t$ to represent the left hand side of Equation 10 so that:

$$A_t = \begin{bmatrix} -F_{i_2} + F_{i_1} \\ -F_{i_3} + F_{i_1} \\ \vdots \\ -F_{i_{N_t}} + F_{i_1} \end{bmatrix} \quad \text{Equation 11}$$

Equation 10 can be rewritten more compactly as:

$$A_t t = 0 \quad \text{Equation 12}$$

If the branch duration for a main motion branch is varied, then the submotion branches (if any) associated with this branch should be proportionally rescaled.

To represent this set of auxiliary constraints some notation must first be defined. Denote the branch numbers corresponding to the main motion branches (including only branches that have associated submotion branches) by the set $\{M_1, M_2, \ldots M_{Nm}\}$ where Nm is the total number of main motion branches that have associated submotion branches. Denote the submotion branches associated with the $k^{th}$ main motion branch by the set $\{m_{k1}, m_{k2}, \ldots m_{kNk}\}$, where $N_k$ is the total number of submotion branches associated with the $k^{th}$ main motion branch. Each submotion branch duration represents a fixed fraction of the associated main branch duration. Let $\alpha_{kj}$ denote this fixed fraction for the $j^{th}$ submotion branch associated with the $k^{th}$ main motion branch.

The required set of constraints associated with the $k^{th}$ main motion branch can now be represented by the equation:

$$\begin{bmatrix} F_{m_{k1}} - \alpha_{k1} F_{M_k} \\ F_{m_{k2}} - \alpha_{k2} F_{M_k} \\ \vdots \\ F_{m_{kN_k}} - \alpha_{kN} F_{M_k} \end{bmatrix} t = \begin{bmatrix} 0 \\ 0 \\ \vdots \\ 0 \end{bmatrix} \quad \text{Equation 13}$$

Defining the matrix $A_{M_k}$ to represent the left hand side of Equation 13 so that:

$$A_{M_k} = \begin{bmatrix} F_{m_{k1}} - \alpha_{k1} F_{M_k} \\ F_{m_{k2}} - \alpha_{k2} F_{M_k} \\ \vdots \\ F_{m_{kN_k}} - \alpha_{kN} F_{M_k} \end{bmatrix} \quad \text{Equation 14}$$

we can rewrite Equation 13 more compactly as:

$$A_{M_k} t = 0 \quad \text{Equation 15}$$

Further, defining the matrix $A_m$ as:

$$A_m = \begin{bmatrix} A_{M_1} \\ A_{M_2} \\ A_{M_3} \\ \vdots \\ A_{M_{NM}} \end{bmatrix} \quad \text{Equation 16}$$

the complete set of auxiliary submotion constraints can be expressed by the equation:

$$A_m t = 0 \quad \text{Equation 17}$$

One reference node in the network is selected, and the absolute time at which this event is to occur is set to zero. Denoting the node number of the reference node as k, this constraint can be expressed as:

$$A_z t = 0 \quad \text{Equation 18}$$

where the $k^{th}$ element of the row vector $A_z$ has a value of 1 and all other elements are zero.

Finally, the Augmented Constraint Matrix A is defined by:

$$A = \begin{bmatrix} -F_r \\ A_t \\ A_m \\ A_z \end{bmatrix} \quad \text{Equation 19}$$

where $F_r$ is the reduced branch incidence matrix formed by eliminating all of the now redundant rows in F. Specifically, the rows corresponding to all of the submotion branches, and all but the first cyclic branch are removed from F to form $F_r$.

The length $N_b + N_1 + N_M + 1$ vectors $b_{min}$ and $b_{max}$ are defined by:

$$b_{min} = \begin{bmatrix} \delta_{min} \\ 0 \end{bmatrix} \quad \text{Equation 20}$$

$$b_{max} = \begin{bmatrix} \delta_{max} \\ 0 \end{bmatrix} \quad \text{Equation 21}$$

The complete set of network constraints can then be expressed by combining Equation 6, Equation 7, Equation 12, Equation 17, Equation 20 and Equation 21 into the single set of augmented constraint equations:

$$At \leq b_{max} \quad \text{Equation 22}$$

$$At \geq b_{min} \quad \text{Equation 23}$$

In the right hand side of Equation 22 and Equation 23 the final $N_t + N_M + 1$ elements of the vectors $b_{max}$ and $b_{min}$, respectively, are always identically zero. The objective is to find a set of event times (schedule) which satisfy all the required network constraints. In general, there will be more than one, in fact, infinitely many, schedules that will fit the network constraints. A constrained optimization based methodology is therefore employed to select the most desirable schedule from the many available possibilities. The general approach can be tailored to fit a variety of practical problems by making judicious choices of the optimization criterion. Some informally stated examples of optimization criteria that are of practical interest include:

1. Minimizing the cycle period with specified thermal process durations
2. Maximizing particular thermal process durations, for example reheat, within a fixed cycle period.
3. Minimizing wear and tear by slowing down mechanisms as much as possible with a fixed cycle period and specified set of thermal process durations.

Optimal schedules utilizing such criteria are readily obtained using the new methodology which has been developed.

In terms of the matrix algebraic model representation, described previously, the general problem to be solved is to find a length $N_n$ vector t of nodal times which satisfies:

$$\text{minimize } f(t) \quad \text{Equation 24}$$

subject to the constraints:

$$At \leq b_{max}$$

$$At \geq b_{min}$$

The scalar function f, referred to as the objective function, specifies the criterion for distinguishing the most desirable of the many possible solutions to the problem. This is known as a Constrained Optimization Problem (as opposed to an Unconstrained Optimization Problem) because we are seeking an optimal solution but are limiting the set of possible solutions to those that satisfy a specified set of constraints. In this case, the constraints are expressed as a set of linear inequalities.

A wide variety of practical criteria can be expressed in terms of a quadratic objective function of the form (actually, the constant term, $f_0$, is not strictly required since it has no effect on the location of the system's minima and maxima. It is only retained here because it later allows the value of the objective function to be given a more obvious interpretation as the distance of the actual branch durations from the desired target values.

$$f(t) = \tfrac{1}{2}t^T Ht + Ct + f_0 \qquad \text{Equation 25}$$

As will be detailed subsequently, the essential machine scheduling problems can in fact be expressed using a quadratic objective function of the form given in Equation 25.

An optimization problem that has this combination of a quadratic objective function, and linear constraints is known as a Quadratic Programming Problem. A large variety of fast and reliable numerical algorithms exist for solving Quadratic Programming Problems. In some practical cases (for example minimizing the cycle period) the optimization criteria can be expressed using a linear objective function of the form of given:

$$f(t) = Ct + f_0 \qquad \text{Equation 26}$$

This combination of a linear objective function with linear constraints is known as a Linear Programming Problem. Linear Programming problems, in many cases, can be solved with less computational effort and therefore even faster than Quadratic Programming Problems, but the Quadratic Programming Solver used to save linear and quadratic objective functions is the most economical solution.

The basic idea of the GTSSM (General Target Schedule Synthesis Methodology) is to assign a target value for the duration of each branch in the network. These target values represent the ideal set of values the user would like to attain for all of the branch durations. Because of the many network constraints that must also be satisfied, it may not in fact be possible to obtain all of the target branch duration values. The GTSSM therefore finds a schedule that matches the target values as closely as possible.

The GTSSM achieves it ability to provide a single approach to a variety of problems through the use of four major features:

1. Quadratic Objective Function—A quadratic objective function makes mathematically precise the notion of a schedule being as close to the target value as possible.
2. Hard Limits—Hard upper and lower limits can be imposed on the allowable durations for each network branch.
3. Locking—Durations of specified branches can be locked so that they are achieved exactly in the resulting schedule.
4. QP Solver—Use of a robust QP (Quadratic Programming) numerical solver. Each of the above features will now be described in further detail.

The intuitive notion of a schedule being close to the target value must be made mathematically precise in order to implement an automated numerical solution. For this purpose define the objective function, f(t), as follows:

$$f(t) \sum_{i=1}^{N_b} (w_i(\delta_i(t) - \delta_{t_i}))^2 \qquad \text{Equation 27}$$

where:

$w_i$=a constant which weights the importance of the deviation between the target and actual duration for the $i^{th}$ network branch $\delta_i(t)$=duration of the $i^{th}$ network branch as a function of t, the length $N_n$ vector of nodal event times (schedule)

$\delta_{t_i}$=target duration for the $i^{th}$ network branch $N_b$=total number of network branches Thus, the distance, from the target is expressed as the weighted, sum of the squared deviations between the target and actual branch durations. It is noted that for the two or three-dimensional case ($N_b$=2 or $N_b$=3) and $w_i$=1, Equation 27 expresses the familiar Euclidean Distance Formula.

Noting that the branch duration for the $i^{th}$ branch duration can be expressed in terms of the $i^{th}$ row of the branch incidence matrix as:

$$\delta_i = -F_{it}$$

Equation 27 can be expressed in terms of the previously defined Matrix Algebraic System Model as:

$$f(t) = (W(Ft + \delta))^T (W(Ft + \delta)) \qquad \text{Equation 28}$$

where:

W=weighting matrix

δ=vector of target branch durations

F=branch incidence matrix

T=length $N_n$ vector of nodal event times (schedule)

superscript T=matrix transpose

Following routine algebraic manipulation Equation 28 can be rewritten as:

$$f(t) = t^T F^T W^T WFt + 2\delta_t W^T WFt + \delta_t^T W^T W \delta_t \qquad \text{Equation 29}$$

Equation 29 can then be expressed in the standard form given in Equation 25 for a quadratic objective function:

$$f(t) = \tfrac{1}{2} t^T Ht + Ct + f_0 \qquad \text{Equation 30}$$

where:

$H = 2F^T W^T WF$ $C = {}_2 \delta_t W^T WF$ $f_0 = \delta_t^T W^T W \delta_t$

Some flexibility is available in the definition of the elements of the diagonal weighting matrix. The simplest alternative is to set each of the branch weights $w_i$ to a value of 1 (one) so that W becomes the identity matrix. This gives equal weight to the absolute error (deviation) between the desired and target duration values for all of the network branches. Although in some cases the absolute error approach may be appropriate, it is more commonly the case that we are concerned with the relative error, in which the error for each branch is normalized by its typical duration. Thus, with the relative error approach a deviation of 1 millisecond for a branch whose typical duration is 10 milliseconds is considered to be of the same significance as a deviation of 1 second for a branch whose typical duration is 10 seconds. For the relative error approach we thus define the weighting matrix W by:

$$W = \begin{bmatrix} 1/(\delta_{high_1} - \delta_{low_1}) & 0 & 0 & 0 \\ 0 & 1/(\delta_{high_2} - \delta_{low_2}) & 0 & 0 \\ 0 & 0 & 0 & 0 \\ 0 & 0 & 0 & 1/(\delta_{high_{N_b}} - \delta_{low_{N_b}}) \end{bmatrix}$$

Equation 31 where:

$\delta_{high1}$=The high scale value for the $i^{th}$ network branch
$\delta_{low1}$=The low scale value for the $i^{th}$ network branch It is often useful to have the ability to limit the allowable ranges of particular branch durations. Example situations for requiring this capability might include mechanisms that have a lower bound on their motion duration, and process steps that have lower and/or upper bounds on their duration. These bounds are set in the GTSSM by assigning appropriate values to the elements in the $b_{min}$ and $b_{max}$ vectors forming the right hand sides of the matrix constraint relationships given by Equation 24.

In some cases it is desirable to specify that particular branch durations are to be exactly equal to the target values. This will be referred to as locking the target value. For example, in some cases it is necessary to lock the duration of the cycle branches because the cycle period of upstream equipment such as the feeder can not be readily adjusted. This capability is implemented in the GTSSM by setting the value of the appropriate elements of the upper and lower bounds (vectors $b_{min}$ and $b_{max}$ forming the right hand sides of the matrix constraint relationships given by Equation 24) both equal to the target value. The matrix H should be positive definite). To avoid complications with this numerical problem, small weights can be assigned even to branches whose duration's are not of interest. or a solver can be used that specifically treats the case where H is only positive semidefinite.

Based upon either prior experience or specific tests, the desired durations of all of thermal forming process steps (reheat, final blow, etc.) may be known and the bottle maker may not wish these values to vary. With the cycle period branch duration unlocked, all of thermal-forming related branch durations locked, and mechanism motion branches duration locked at the value corresponding to the fastest possible mechanism travel durations, the target duration for the cycle period could be set to zero (indicating that it is desired to have it as short as possible). The QP solver will then find the schedule with the shortest possible cycle period consistent with all of the network constraints (These constraints include the locked thermal process durations and mechanism motion durations along with the requirement for collision avoidance, proper sequencing, etc.).

It is quite possible that a particular schedule may achieve the required cycle period and desired set of thermal formal process durations but that it requires moving some mechanisms faster than is strictly necessary to achieve these objectives. It may be desirable instead to operate the mechanisms only as fast as is absolutely necessary to achieve the other desired objectives. This would reduce the average and peak current to the servomotors (and associated motor heating) and perhaps otherwise reduce general wear and tear on the system. To do this, the cycle period and other thermal process branch durations would be locked at their desired values. All of the motion branch durations would be unlocked, and their target values set to a relatively large value. The QP solver would then have the freedom to speed up the mechanism if required to meet the constraints on cycle period and thermal process durations, but otherwise it would increase the motion durations as much as possible.

When the desired target values can not be exactly achieved, the user can be provided with some indication of which bounds must be relaxed in order to more closely achieve the desired objective. This can be done by examining the Lagrange Multiplier Values computed at the location of the optimum schedule. The Lagrange Multipliers can be given the interpretation of being the partial derivatives of the objective function with respect to the elements in the $b_{min}$ and $b_{max}$ vectors forming the right hand sides of the matrix constraint relationships given by Equation 24. Thus non-zero values for a particular Lagrange Multiplier indicates that the objective function would be either increased or decreased (depending on the algebraic sign of the Lagrange Multiplier) by changing the value of the associated element of the $b_{min}$ and $b_{max}$ vectors. Such constraints are said to be active. Other constraints whose Lagrange Multiplier values are zero are said to be inactive. By appropriately displaying to the user the active constraints ranked by the relative magnitude of their Lagrange Multiplier values the user would be informed as to which bounds are imposing the greatest limitation on achieving the desired results. Further, the sign of the Lagrange multiplier could be used to determine, and subsequently display to the user, whether the target value (in the case of a locked branch) should be increased or decreased to further improve the ability to achieve the target values of the unlocked branches. Most constrained optimization algorithms provide for the capability to compute Lagrange Multiplier values (or already compute them as part of their normal operation), so this additional information could be utilized to provide further guidance to the user if desired If the user overly constrains the system there may be no feasible solution to the QP problem that has been posed. In such a case it is important to recognize that the problem is infeasible, and to relax the bounds enough to allow a feasible solution to occur. QP solvers typically are able to recognize that there is no feasible solution and return an appropriate flag. This flag can be used by the software that implements the GTSSM to trigger a prompt to the user to relax any constraints as much as possible.

The MAR (Matrix Algebraic Representation) also allows a proposed schedule to be analyzed in order to discover any potentially damaging or undesirable constraint violations. This capability provides a mechanism for performing intelligent input qualification on user requested changes to event times which goes well beyond conventional high and low bound checking.

The basic purpose of the schedule analysis methodology is to provide the capability to check a proposed schedule for constraint violations and then to report any violations that might be found. The method also allows violations to be reported in a way that allows a user to understand the consequences of the violation and, to the extent possible, indicates a remedy.

The actual checking of the constraint violations is computationally quite simple involving only a single matrix multiplication and subtraction. To fully obtain the desired functionality there are some additional considerations that must also be taken into account. The additional complexity arises primarily from the fact that the can only schedules nodal (event) times for a subset of the nodes in the overall system model. This subset of nodes is referred to as the set of independent nodes. The nodal times for the remaining, dependent nodes, is then automatically calculated from the independent nodal times and known, fixed branch durations.

The overall methodology then consists of the following components:
1 Solving for Dependent Nodal Times
2 Detecting Constraint Violations
3 Diagnosing and Categorizing Violations Dependent Nodal Times can be solved for in terms of the previously defined constraint set by utilizing the following procedure.

1. Form the subset of equality constraints as:

$$A_{eq}t = b_{eq} \quad \text{Equation 32}$$

By retaining only those rows of A and b (as defined in Equations 19 and 20 respectively) for which the upper and lower bounds are equal. Note that the upper and lower bounds for branches with known, fixed, durations will both be set to this known fixed value. The upper and lower bounds of these fixed duration branches will therefore be equal and the rows of A corresponding to these branches along with the auxiliary constraints will thus be retained in $A_e$. Typically the branches with known fixed values will be the Motion, Cyclic and Simultaneity branches. In order to have a well posed problem, the row dimension of $A_{eq}$ must be greater than or equal to the number of dependent nodal times. It is required that a sufficient number of branches be assigned fixed values such that this condition is met.

2. By reordering the columns of $A_{eq}$, form the partitioned incidence matrix $A_p$, in which the first $N_I$ columns of $A_p$ correspond to the independent nodal times. Form the partitioned nodal time vector $t_p$ by sorting the columns of t to correspond to the new column order in $F_p$, Equation 32 can then be rewritten as:

$$[A_{P_I} A_{P_D}] \begin{bmatrix} t_{P_I} \\ \cdots \\ t_{P_D} \end{bmatrix} = b_{eq} \quad \text{Equation 33}$$

3. Rearrange Equation 33 to form the set of linear equations $$A_{P_D}t_{P_D} - (b_{eq} - A_{P_I}t_{P_I}) = 0 \quad \text{Equation 34}$$

5. Assign current values to the independent nodal event times and elements of $b_{eq}$ corresponding to fixed branch duration and solve the overdetermined system of Equations 34, for $t_{P_D}$. This can be done using standard numerical methods available for solving overdetermined systems of linear equations, e.g. a Linear Least Squares Solver. For a consistent set of fixed branch durations and properly constructed Network Constraint Diagram an exact solution to this overdetermined problem may be obtained. That is, a vector of dependent nodal times $t_{P_D}$ can be found that satisfies Equation 34 without any error. If an exact solution can not be found then the user should be notified accordingly so that the situation can be remedied. It is noted that the zero reference node should be included with the independent event times and be consistent with the definition provided in Equation 18.

6. The elements of of $t_{P_D}$ and $t_{P_I}$ are resorted into their original order corresponding to the rows of Equations 22 and 23 to form a vector of times, $t_{proposed}$ constituting the proposed schedule.

Once the dependent times have been calculated and a proposed schedule is available, actually detecting constraint violations is relatively straightforward. Let the proposed schedule be given by the vector of nodal times, $t_{proposed}$. From Equation 22 and Equation 23 the conditions to be checked are then given by the set of inequalities:

$$At_{proposed} - b_{max} \leq 0 \quad \text{Equation 35}$$

$$At_{proposed} - b_{min} \geq 0 \quad \text{Equation 36}$$

if the inequalities given in either Equation 35 or Equation 36 are not completely satisfied then the proposed schedule violates at least one constraint.

Each row in Equation 35 and Equation 36 represents a particular system constraint. Explanatory text and a severity level can accordingly be assigned to each row in these equations. A proposed schedule would then be tested by evaluating Equation 35 or Equation 36. The row numbers of any rows that did not satisfy the required inequality would then provide an index for recalling and displaying corresponding error message text. The severity level could be used to sort multiple constraint violations in order of severity, and could also key for an appropriate color code, or other attribute (flashing) on the graphical user interface.

This assignment of text and severity level can be done in an automatic manner. To understand how such an automatic assignment can be performed, recall that the rows in Equation 35 or Equation 36 are derived from network branches. The violation implied by each branch type can therefore be an attribute that is assigned to the particular branch type and then further specified for the particular branch. For example for a collision branch we could automatically define the violation text to read "collision occurs between invert and baffle" this event could also be assigned a severity level for example a number between 1 and 10 with 10 being the most severe. The corresponding row in Equation 35 or Equation 36 would then inherit these descriptions from the branches they descend from. Alternatively, once a Network Constraint Diagram was fully defined for a particular forming process, individual messages could be manually entered or the automatically generated default set could be edited and the resulting data stored in a table for each of the finite number of constraint violations which might occur. While this manual approach could perhaps allow some enhancement to the readability of the messages, it could also be error prone, and would have to be updated if any changes were made to the Network Constraint Diagram. The automatic approach is thus preferred.

Figure 12A:
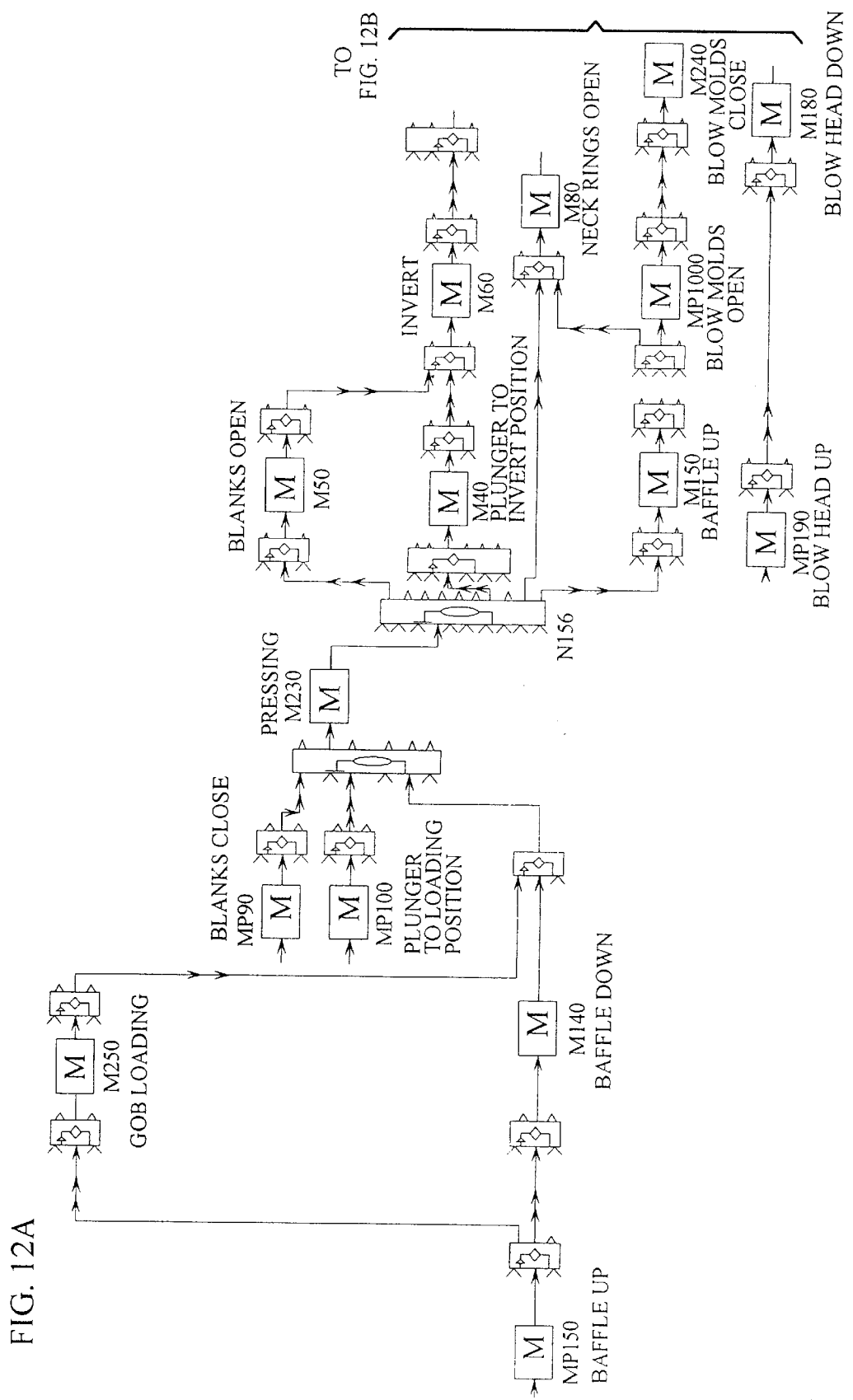
FIGS. 12A and 12B are a network diagram for use to unwrap a wrapped cycle.
Figure 12B:
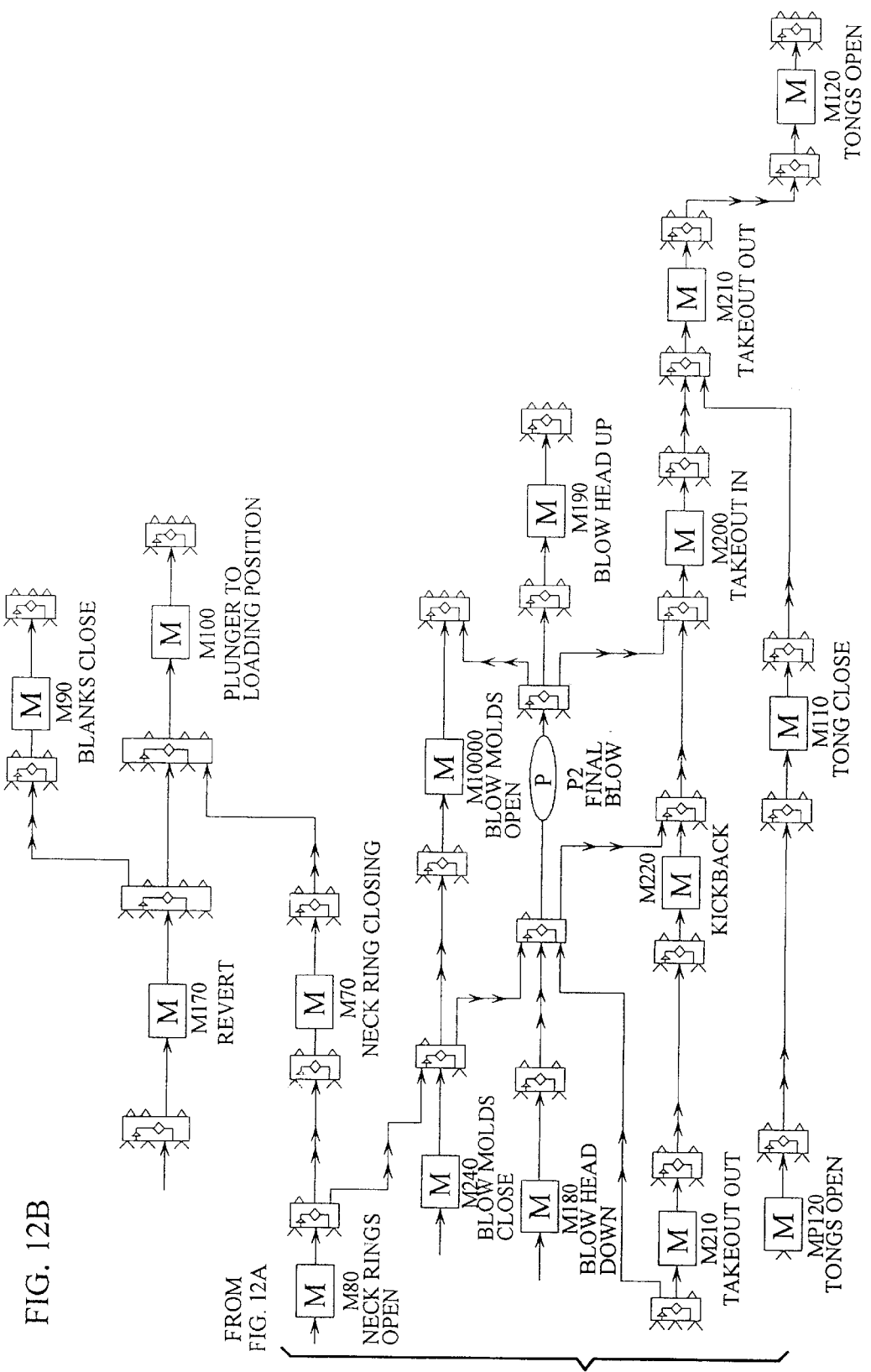

In a state of the art control, the operation of one of these mechanisms/processes is controlled by turning the mechanism, etc., "on" and "off" at selected angles within a 360° cycle. The turning "on" of a mechanism is an event and the turning "off" of a mechanism is an event. FIG. 12 illustrates a conventional list of timed events with their angular "on" and "off" times for an I.S. machine. This list is available from the machine control.

The unwrapped schedule can be converted to a corresponding wrapped schedule using the known cycle period and calculating event angles modulo 360 degrees (event angle=modulo 360(unwrapped event time/cycle period)× 360. To go from a wrapped schedule to an unwrapped schedule the original network constraint diagram is augmented with a new set of directed branches called unwrapping branches. The subgraph formed from the unwrapping branches along with the motion and sequence branches and any nodes that are incident on these branches will be referred to as the cycle unwrapping graph. An example of a Cycle Unwrapping Graph is illustrated in FIG. 12 which shows a press and blow cycle. The CUG (Cycle Unwrapping Graph) is created so as to have the following properties.

Property 1. The CUG is a connected graph

Property 2. The nodes of the CUG are exactly the set of all the source and destination nodes for all of the motion and process branches in the NCD (Network Constraint Diagram). This means that every "on" and "off" angle of the timing drum (sequencer) is represented on the graph.

Property 3. Every branch in the CUG is part of a cycle (path from an event to the next periodic repetition of that event). For example, the lowermost line of FIG. 11 proceeds M120 (Tongs Open), M110 (Tongs Close), M210 (Takeout Out) and M120. Similarly, the next line up proceeds M210 (Takeout Out),M220 (Kickback), M200 (Takeout In), and M210. The next line up proceeds, M190 (Blow Head Up), M180 Blow Head Down), p2 (Final Blow), and M190. The next line up proceeds MP1000 (Blow Molds Open), M240 (Blow Molds Closed), M1000. The next line proceeds MP100 (Plunger To Loading Position), M230 (Pressing), M80 (Neck Rings Open), M70 (Neck Rings Closing) and M100. The next line proceeds MP90 (Blanks Close), M230, M40 (Plunger To Invert Position), M60 (Invert), M70 (Revert), M90 and the first line from the left proceeds MP150 (Baffle Up), M140 (Baffle Down), M230, M150 (Baffle Up).

Property 4. The branches incident on the nodes of the CUG either fan in or fan out but not both. That is, if there is more than one branch directed towards a given node then there is only one branch leaving that node (fan in). If there is more than one branch leaving a given node then there is exactly one node entering it (fan out)

The above Properties imply that the CUG also has the following additional properties:

Property 5. Any sequence of three nodes that can be traversed by two interconnecting branches following in the branch direction, will be part of at least one common cycle. So each node in the CUG is between two other events in a cyclic sequence.

Property 6. Since each branch in the CUG is part of a cycle it must be less than one period long.

The problem is then solved in a series of steps, which include checks that the input data is properly ordered to provide a valid solution.

1. Form the branch incidence matrix for the CUG.
2. Divide the nodes of the CUG into two sets: The independent nodes whose values are given in the input set of wrapped event angles, and the remaining dependent nodes whose event angles are as yet unknown. For a well posed problem all of the dependent nodes must be connected to an independent node by a branch whose duration is known.
3. Assign the known input event angles to the independent nodes in the CUG to which they correspond.
4. Determine the event angles for the dependent event angles using:

$$\Theta_i = mod((\Theta_j \pm {d_{i\text{-}j}}/{T_{cycle}} *360),360)  \qquad \text{Equation 37}$$

Where:

$\Theta_i$ is the event angle to be calculated for $i^{th}$ dependent node $\Theta_j$ is the dependent node connected to node i through a branch with known temporal duration $d_{i\text{-}j}$.

The algebraic sign in Equation 37 is chosen as positive when the dependent node is downstream from the independent node and negative otherwise.

5. Assign the event angle for any periodic repetition nodes to equal the value of the node which it replicates (the node to which it is connected to by a cyclic branch in the NCD).
6. Check that all event angles are in the correct cyclic order. This is done by checking that the event angle assigned to each node is between the value of any pairing of its immediate upstream and downstream adjacent nodes.
7. Find the angular branch durations for all of the branches in the CUG using:

$$\delta = mod(-F\Theta, 360) \qquad \text{Equation 38}$$

Where:

F is the branch incidence matrix for the CUG $\Theta$ is the vector of nodal event angles in the CUG $\delta$ is the vector of angular branch durations in the CUG 8. Convert $\delta$, the vector of angular branch durations to a vector d of temporal duration using:

$$d = \delta/360 * T \qquad \text{Equation 39}$$

where T is the cycle period.

9. Solve for the unwrapped nodal event times by solving, using standard numerical methods, the possibly overdetermined system:

$$-F_r t = \delta \qquad \text{Equation 40}$$

Where $F_r$ is the branch incidence matrix of the CUG with the column corresponding to the zero reference node deleted. (The choice of zero reference node is arbitrary but should be consistent with that of the NCD.) Although the above system is overdetermined the least squares solution will in fact have zero error because $\delta$ is in the column space of $F_r$. This should be verified to identify any computational problems.

10. The independent nodes in the NCD are assigned values using the corresponding unwrapped event times that are determined from equation 4. The dependent nodes in the NCD can then be determined as previously described.

Figure 13:
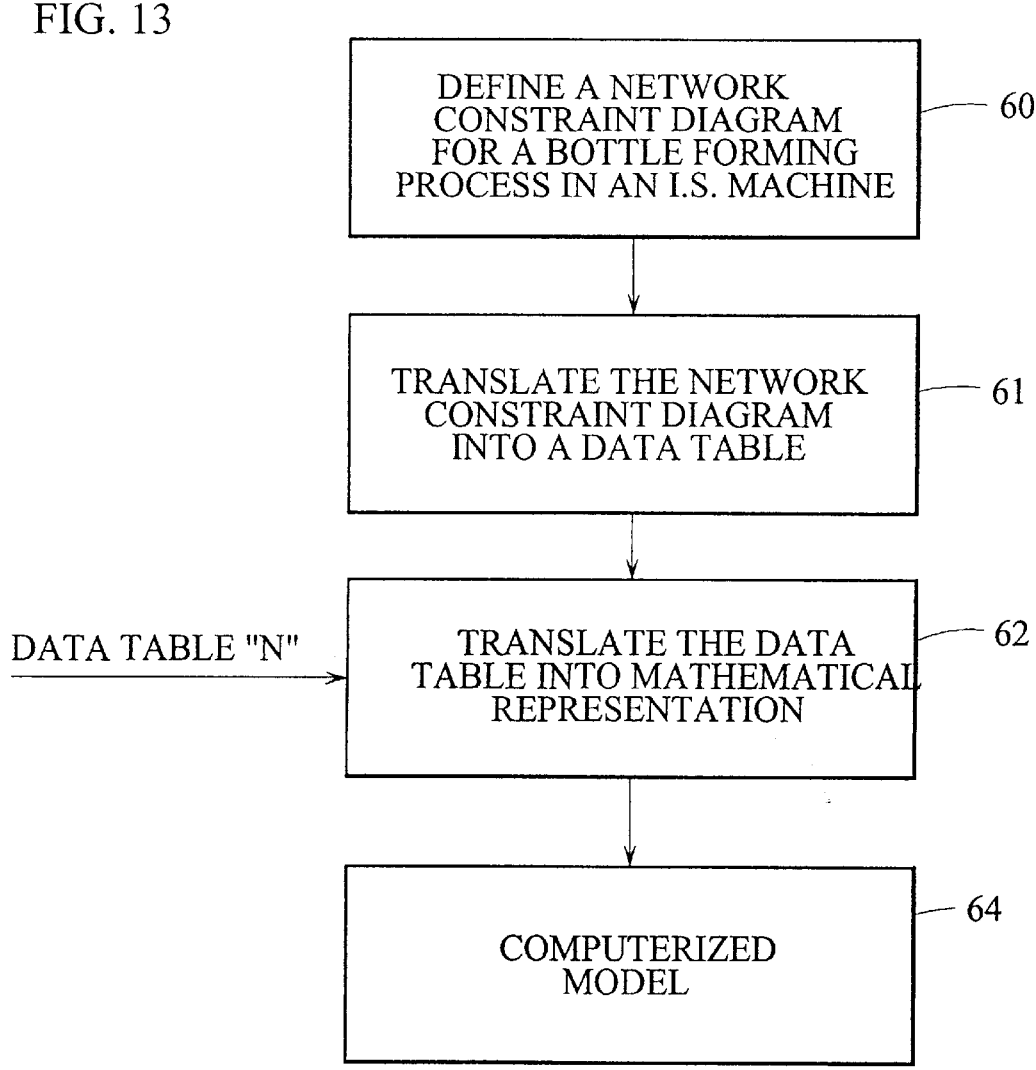
FIG. 13 is a block diagram illustrating the creation of a computerized model of a mathematical representation of a network constraint diagram unwrapped from a wrapped cycle.

FIG. 13 is a block diagram illustrating the making of the analytical tool (Tool). The first thing is to Define A Network Constraint Diagram For A Bottle Forming Process In An I.S. Machine 60 (an unwrapped cycle following the formation of the gob, its delivery to the blank station, the transfer of a parison from the blank station to the blow station and the removal of a formed bottle from the blow station). Then Translate The Network Constraint Diagram Into A Data Table 61 which is a compilation of the essential data in the constraint diagram and includes lists of all branches and for each, identifies its name, type, start node number, end node number, etc. This can be done manually by examining a drawing of the constraint diagram or a computer can do this from a computerized drawing of the constraint diagram. The next step is to Translate The Data Table Into A Mathematical Representation 62 which is then transformed into a Computerized Model 64 for evaluation. In the illustrated embodiment the computerized model is based on matrix mathematics but other mathematical approaches could be used. Depending on the nature of the bottle and the process used to make the bottle (press and blow, blow and blow, for example), different data tables may be required. As shown, a number of data tables (Data Table "N") may be stored in memory and input as desired.

Figure 14:
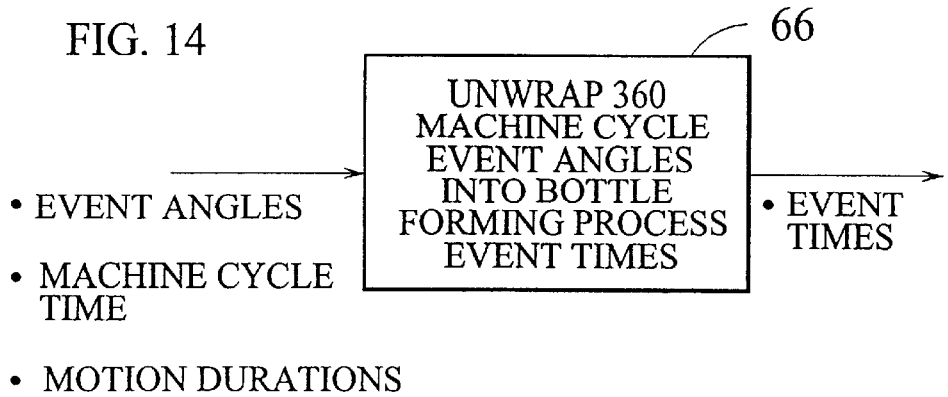
FIG. 14 is a block diagram illustrating the portion of the computerized model which converts wrapped event angles into unwrapped event times.

FIG. 14 illustrates the portion of the Computerized Model 64 which will Unwrap 360° Machine Cycle Event Angles Into Bottle Forming Process Event Times 66 (Unwrapping). It receives, as inputs, either as downloaded data from a machine control 42 (FIG. 1) or the like, or via manual entry at a console, terminal or the like, the Event Angles, the Machine Cycle Time (the cycle time for a 360° timing drum for an I.S. machine) and the Motion Durations (the "M" (capital M) durations for the displaceable mechanisms) and outputs Event Times in the bottle forming process. It should be noted that while the event angles and machine cycle time are normally available data from an existing job file, motion durations would have to be defined for the job.

Figure 15:
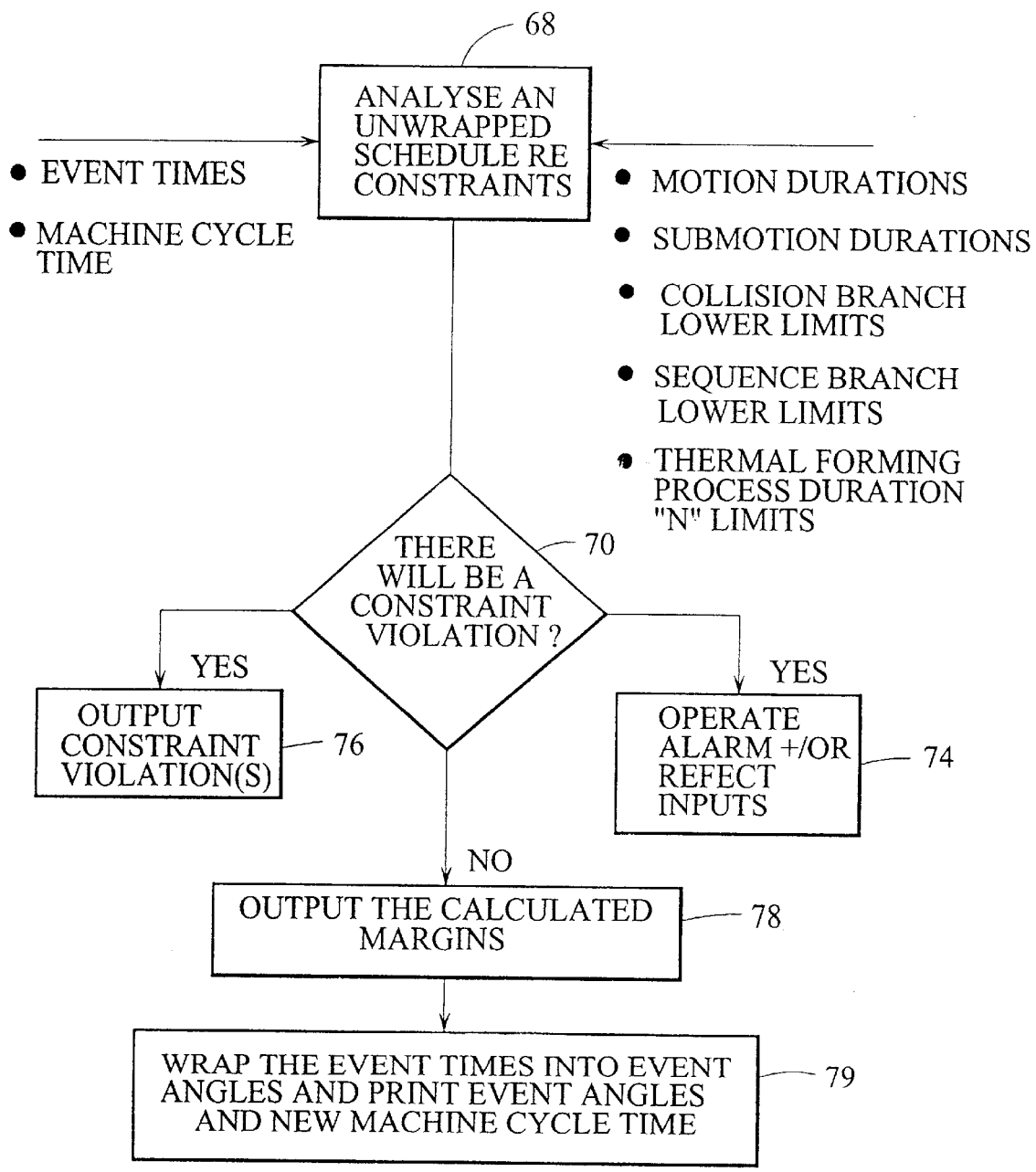
FIG. 15 is a logic diagram illustrating the operation of a control using the computerized model to analyze an unwrapped schedule re constraint violations such as sequence, collision, or duration violation.

FIG. 15 illustrates the use of this Computerized Model 64 to Analyze An Unwrapped Schedule Re Constraints 68 (Constraint Violation Avoidance). With Event Times, Machine Cycle Time, Motion Durations, Submotion Durations (the "m" (small m) motion durations for the displaceable mechanisms), the Collision Branch Lower Limits, the Sequence Branch Lower Limits, and the Thermal Forming Process "N" Limits as inputs, the computerized model can determine whether There Will Be A Constraint Violation? 70. While the word input means that the inputted information is made available, it might be available form different sources. For example, the event angles and machine cycle time could be available from an existing job file, whereas the rest of the inputs would be inputted at the time when the data table is inputted into Translate The Data Table Into A Mathematical Representation 62.

Whenever an input can have a range of values that may be selected by the operator, such input will include the upper and lower limits of that input, and a choice as to whether the setting is to be locked at a specific value or unlocked to permit its location somewhere within the limits. Nominally the lower limits for the Collision and Sequence Branches can be set at zero or at a selected margin of error and this can be locked out from the operator or the operator may be given access to these inputs so that the operator can define any desired lower limits. One constraint violation would be a schedule that would result in something happening in the wrong sequence. Another would be a schedule that would result in a collision. Either of these constraint violations could be determined without Thermal Forming Process Duration "N" Limits. With this additional input(s), the unwrapped schedule could be evaluated to determine whether one or more of the Thermal Forming Process Durations will be either too short or too long and thereby violate one or more of the thermal forming process constraints. These inputs and outputs, as well as inputs and outputs in latter discussed embodiments, could be available for viewing on any suitable screen.

If either inquiry obtains an affirmative answer, the control will Operate Alarm and/or Reject Inputs 74 and Output Constraint Violation(s) 76. If neither inquiry is answered in the affirmative the control can Output The Calculated Margins 78 to give the operator some idea as to how tight the schedule is and then Wrap The Event Times Into Event Angles And Print The Event Angles and New Machine Cycle Time 79. "Print" is intended to mean the presentation of data in either operator readable form as an output presented on a screen or a document or machine readable form so that the machine control can automatically operate on the data such as by resetting the machine with the new event angle and machine cycle time.

In one mode, an I.S. machine may be running and the operator may want to change one or more of the event angles in the 360° timing drum. A particular Job is being run and basic data for that job (the durations and limits) has already been inputted into the control. This data along with the machine cycle time can be downloaded from the machine control. The Event Angles including any proposed Event Angle change can be downloaded to the unwrapper 66 so that Event Times can be defined. In another mode, an operator may have a record (Event Angles and Machine Cycle Time) of a job that was run previously and want to evaluate some changes before he starts the job.

In a conventional I.S. machine which has a number of mechanisms that are operated via pneumatic cylinders, Motion Durations and Submotion Durations may have to be empirically defined, as with high-speed cameras. Where interferences involve actuators which are displaced pursuant to motion profiles, the submotion zones can either be empirically defined or they may be mathematically determined.

Figure 16:
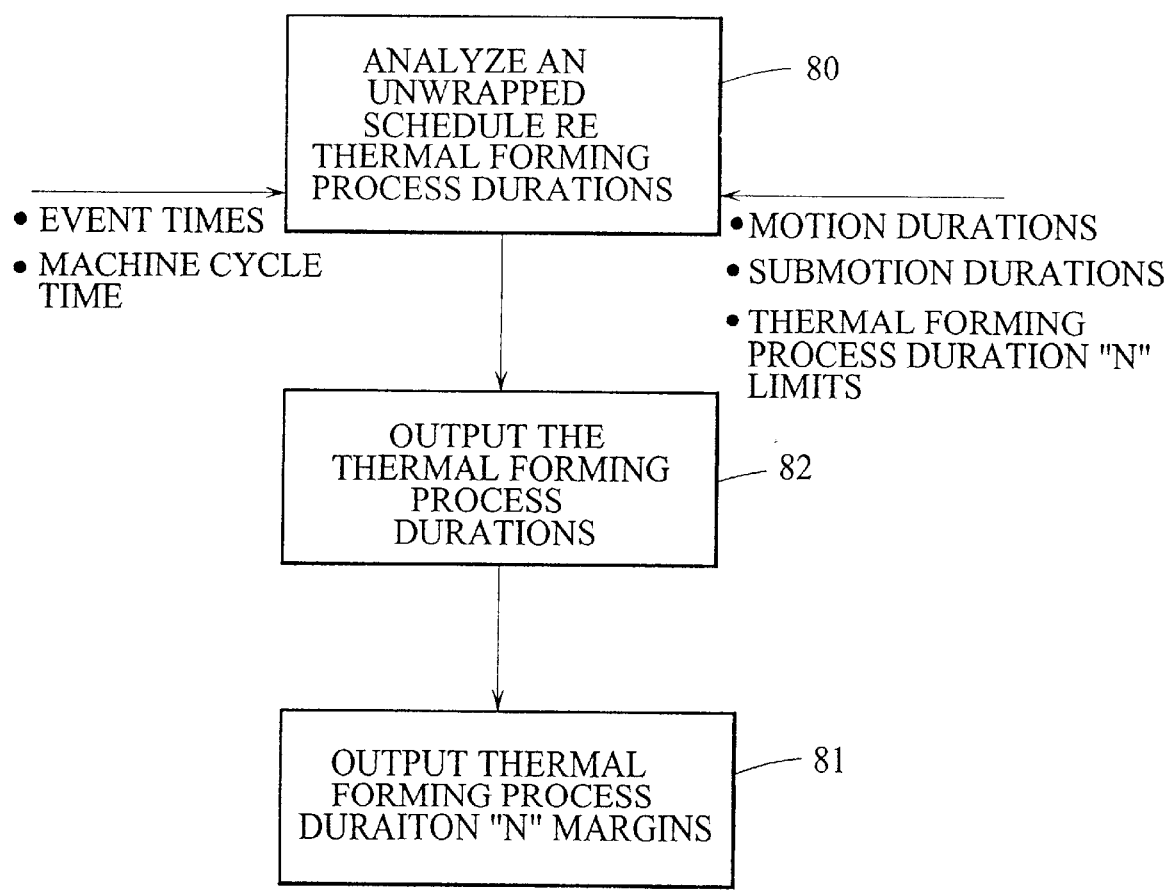
FIG. 16 is a logic diagram illustrating the operation of a control using the computerized model to analyze an unwrapped schedule to define the duration of the thermal forming processes.

FIG. 16 illustrates the use of this computerized model to monitor the thermal forming process durations (Thermal Forming Process Durations). With Event Times, Motion Durations, Submotion Durations and Machine Cycle Time known or as inputs, the Computerized Model 64 will Analyze An Unwrapped Schedule Re Thermal Forming Process Durations 80. and then the Computerized Model 64 will Output The Thermal Forming Process Durations 82. The operator can, accordingly, at any time, see the Thermal Forming Process Durations and based on his experience, make changes to the 360° Event Angles and Machine Cycle Time. With the additional input of Thermal Forming Process Duration "N" Limits, the computer model can also Output Thermal Forming Process Duration "N" Margins 81 so that the operator can see where the time of any process is relative to its allowable time window.

Figure 17:
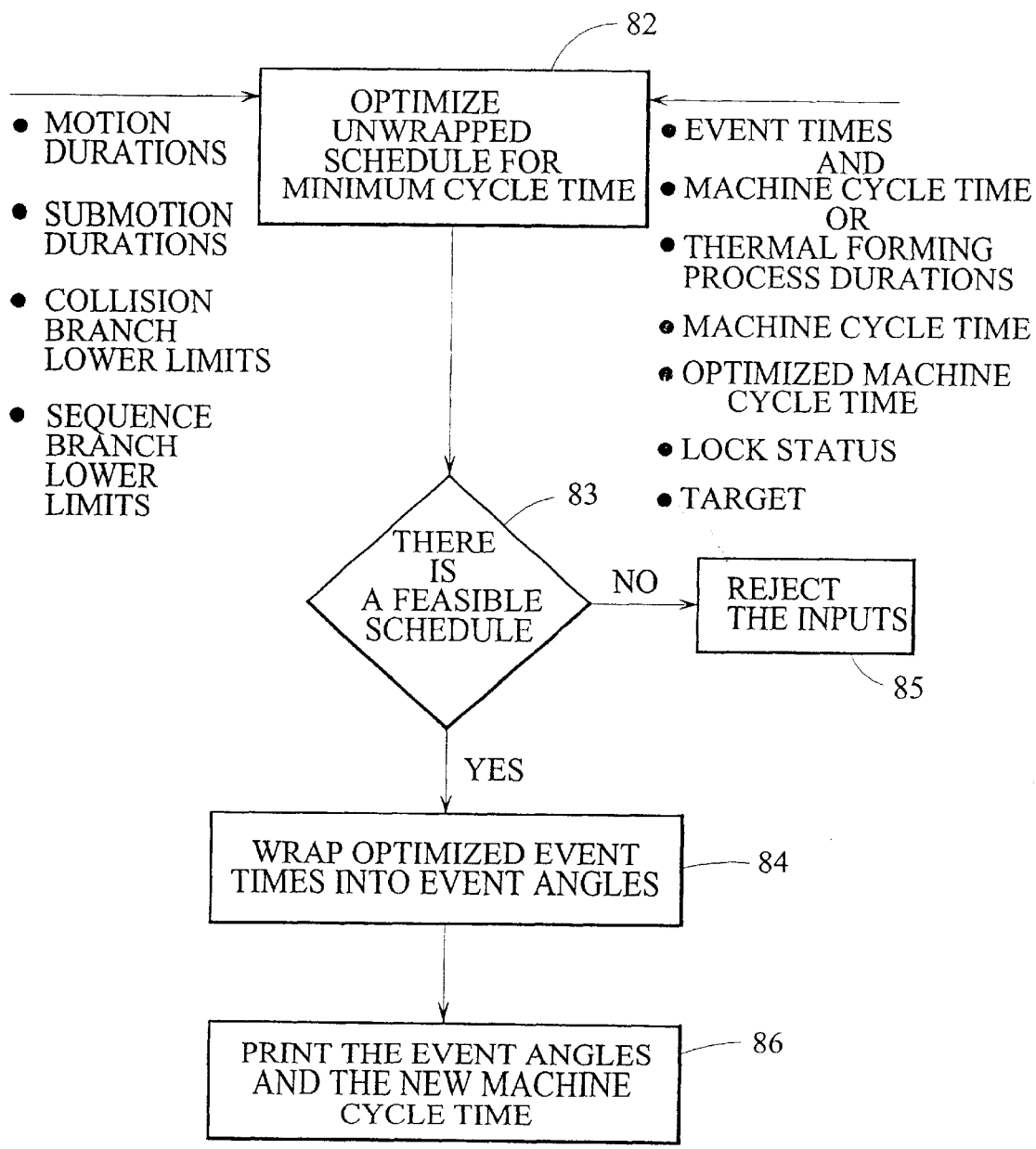
FIG. 17 is a logic diagram illustrating the operation of a control using the computerized model to analyze an unwrapped schedule re the optimization of the schedule.

FIG. 17 illustrates the use of the computerized model to define, for an existing machine set up, the optimized cycle time (Optimized Cycle Time) and the optimized Event Angles for that schedule. With Motion Durations, Submotion Durations, Collision Branch Lower Limits, Sequence Branch Lower Limits, Event Times, Machine Cycle Time, and Optimized Machine Cycle Time/Target/Lock Status known or as inputs to the Optimize Unwrapped Schedule For Minimum Cycle Time 82, the Computerized Model 64 will determine whether There Is A Feasible Schedule? 83. If not the model will Reject The Inputs 85. The Machine Cycle Time and the Event Times may be supplied from the unwrapper and the Optimized Machine Cycle Time may be inputted by the operator. The Event Times and Machine Cycle Time are only required to determine the thermal forming durations so that these valves could be locked before doing the optimization. Equivalent inputs would be the Thermal Forming Durations. The operator can set the Optimized Machine Cycle Time Target to zero with an unlocked status and the Computerized Model will try to optimize the proposed schedule at the lowest possible cycle time. In the event the operator decides that rather than reduce the machine cycle time from the current Machine Cycle Time to the fastest Machine Cycle Time, he would prefer to reduce the cycle time to some machine cycle time therebetween. He can set the Optimized Machine Cycle Time Target at a time intermediate the Machine Cycle Time and the fastest machine cycle time with a locked status. If there is a feasible schedule, the model will Wrap Optimized Event Times Into Event Angles 84 and Print The Event Angles And The New Machine Cycle Time 86 for the schedule cycle so that it will be available for input into the machine controller portion of the control.

Figure 18:
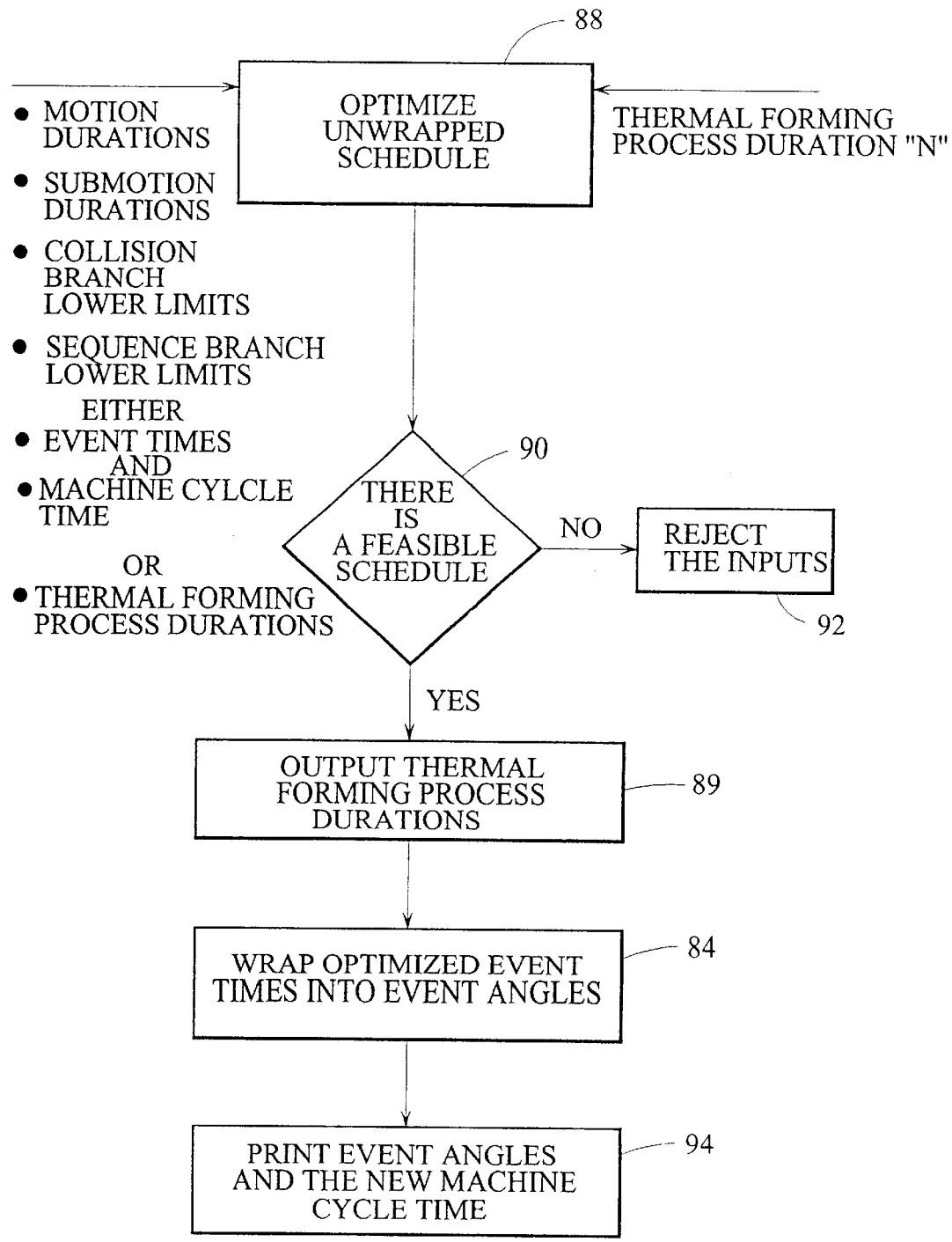
FIG. 18 is a logic diagram illustrating the operation of a control using the computerized model to define the event angles for a feasible schedule with thermal forming process duration "N" inputs.

FIG. 18 illustrates the use of the Computerized Model 64 to tune an operating I.S. machine in response to operator inputs defining one or more of the Thermal Forming Process Durations (Thermal Forming Process Duration "N", and associated Target, Limits and Lock Status). With Machine Cycle Time and Event Times (or Thermal Forming Process Durations), as inputs, and with Motion Durations, Submotion Durations, Collision Branch Lower Limits, Sequence Lower Limits, also as inputs, the Optimize Unwrapped Schedule 88 portion of the Computerized Model 64 will determine whether There is A Feasible Schedule? 90. As shown, there is an additional input: Thermal Forming Process Duration "N", which includes the Target (time), Limits and Lock Status.

The operator may, for example, decide that a defect is occurring because there isn't enough "reheat" time and input a proposed new reheat time. The operator could also input more than one new Thermal Forming Process Durations N1,N2, . . . , during an off line evaluation of the process. In either of these modes the Event Angles for the entire schedule would be available and these could all be inputted by the operator or downloaded from the control for the machine.

If no schedule is feasible, the Computerized Model will Reject The Inputs 92. If a schedule is feasible, the Computerized Control will Output The Thermal Forming Process Durations 89. Such an output might, for example, be a printout for each duration, of the target duration, an indication of whether or not its target duration was locked, and the actual duration located in a window extending between the high and low limits for the duration. Should there be a solution the Wrap Optimized Event Times Into Event Angles 84 portion of the Computerized Model converts the Event Times to Event Angles and proceeds to Print Event Angles And New Machine Cycle Time 94.

Figure 19:
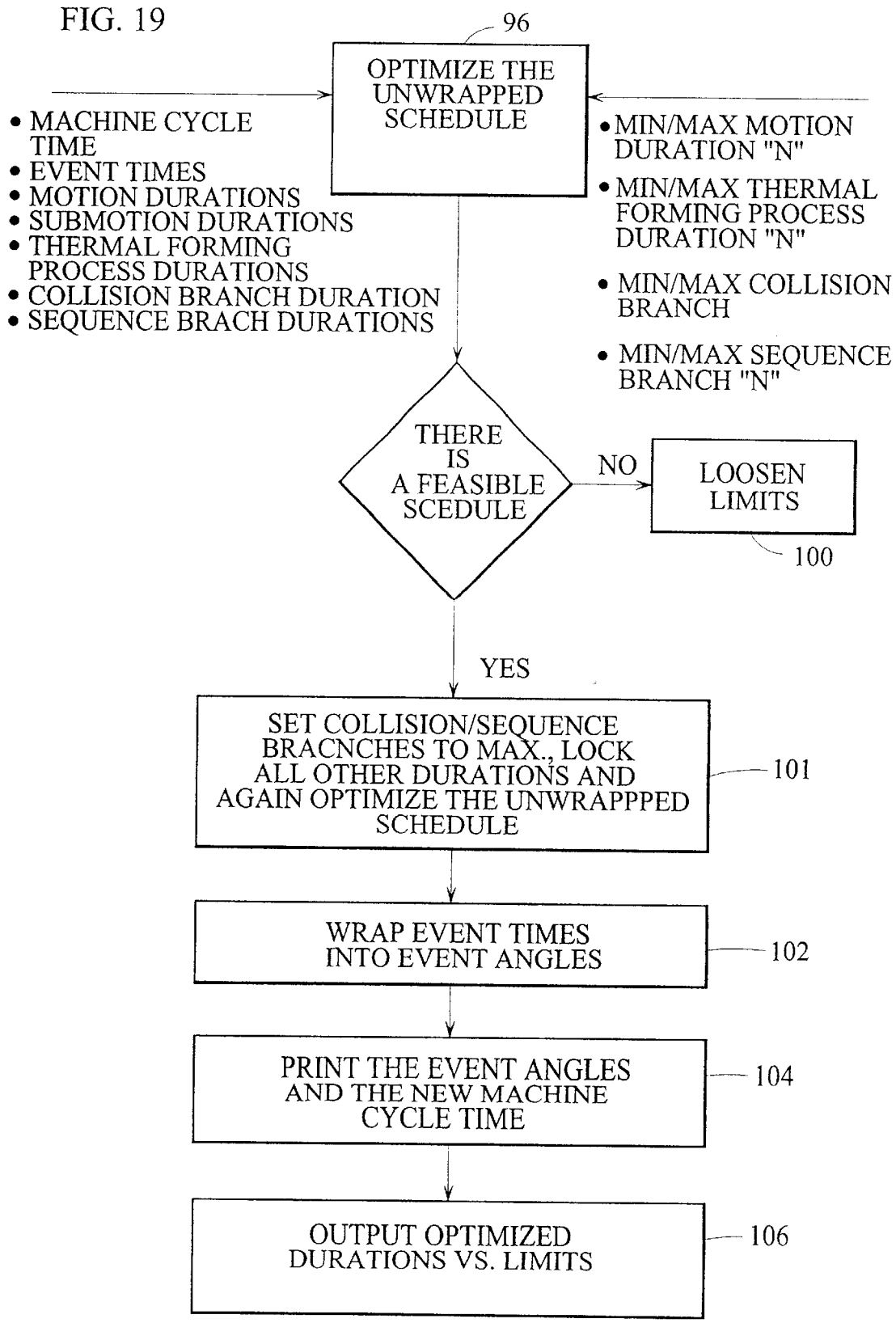
FIG. 19 is a logic diagram illustrating the operation of a control using the computerized model to optimize an unwrapped schedule.

FIG. 19 illustrates the use of the computerized model for complete schedule optimization (Schedule Optimization). Machine Cycle Time, Event Times, Motion Durations, Submotion Durations, Thermal Forming Process Durations, Collision Branch Durations and Sequence Branch Durations which represent target values, are possible inputs to Optimize The Unwrapped Schedule 96. In addition, a number of limits are also inputs: 1. Min/Max Motion Duration "N", 2. Min/Max Thermal Forming Process Duration "N", 3. Min/Max Collision Branch "N", and 4. Min/Max Sequence Branch "N". The Min/Max Motion Duration "N" relates to servomotor driven displacements which can be selectively varied. Given these inputs, The Optimize Unwrapped Schedule finds and optimized schedule if a feasible schedule exists. In the event that the query There Is A Feasible Schedule ? 98 is answered in the negative, the operator will be advised to Loosen Limits 100 so that the operator will try to find a solution by modifying the limits. In the event that the query There Is A Feasible Schedule? 98 is answered in the affirmative, the control may Set Collision/Sequence Branches To Max, Lock All Other Durations and Again Optimize The Unwrapped Schedule 101. This will maximize these branches to further reduce the rate of collision of missequencing. The computer model will then Wrap Event Times Into Event Angles 102, Print The Event Angles And The New Machine Cycle Time 104 and Output Optimized Durations VS. Limits 106. The operator accordingly has the ability to manipulate the unwrapped schedule to the fullest. He can start with an existing job file which traditionally would have the cycle time, event angles, and the servomotion branch durations and work to define an optimized schedule. Alternatively, he could enter the Thermal Forming Process Durations and convert them to the Event Times (a screen, not shown could display all of this information to facilitate his analysis).

Figure 20:
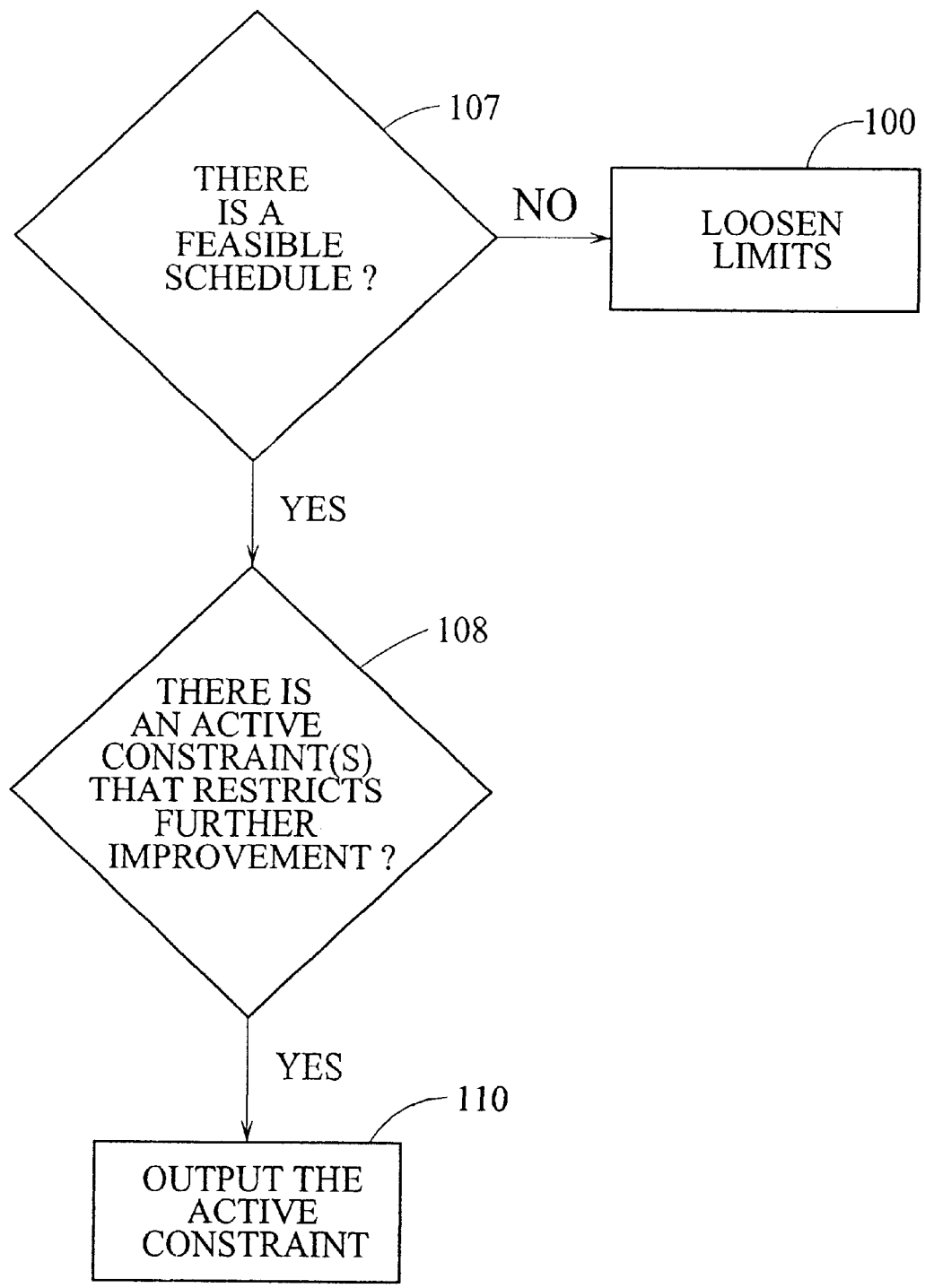
FIG. 20 is a logic diagram illustrating the operation of a control using the computerized model to identify, when a schedule is determined to be feasible, any active constraint that restricts further improvement.

The Computerized Model can, if There Is A Feasible Schedule 107 (FIG. 20), determine if There Is An Active Constraint(s) That Restricts Further Improvement? 108 and will Output The Active Constraint(s) (including the direction to move for improvement) 110. For example, the computerized model may show that the constraint that is preventing optimization is blow mold cooling time. This then enables the operator to address this specific problem to increase the flow of coolant through or at the molds. If there is no solution the operator is advised to Loosen Limits 100.

Figure 21:
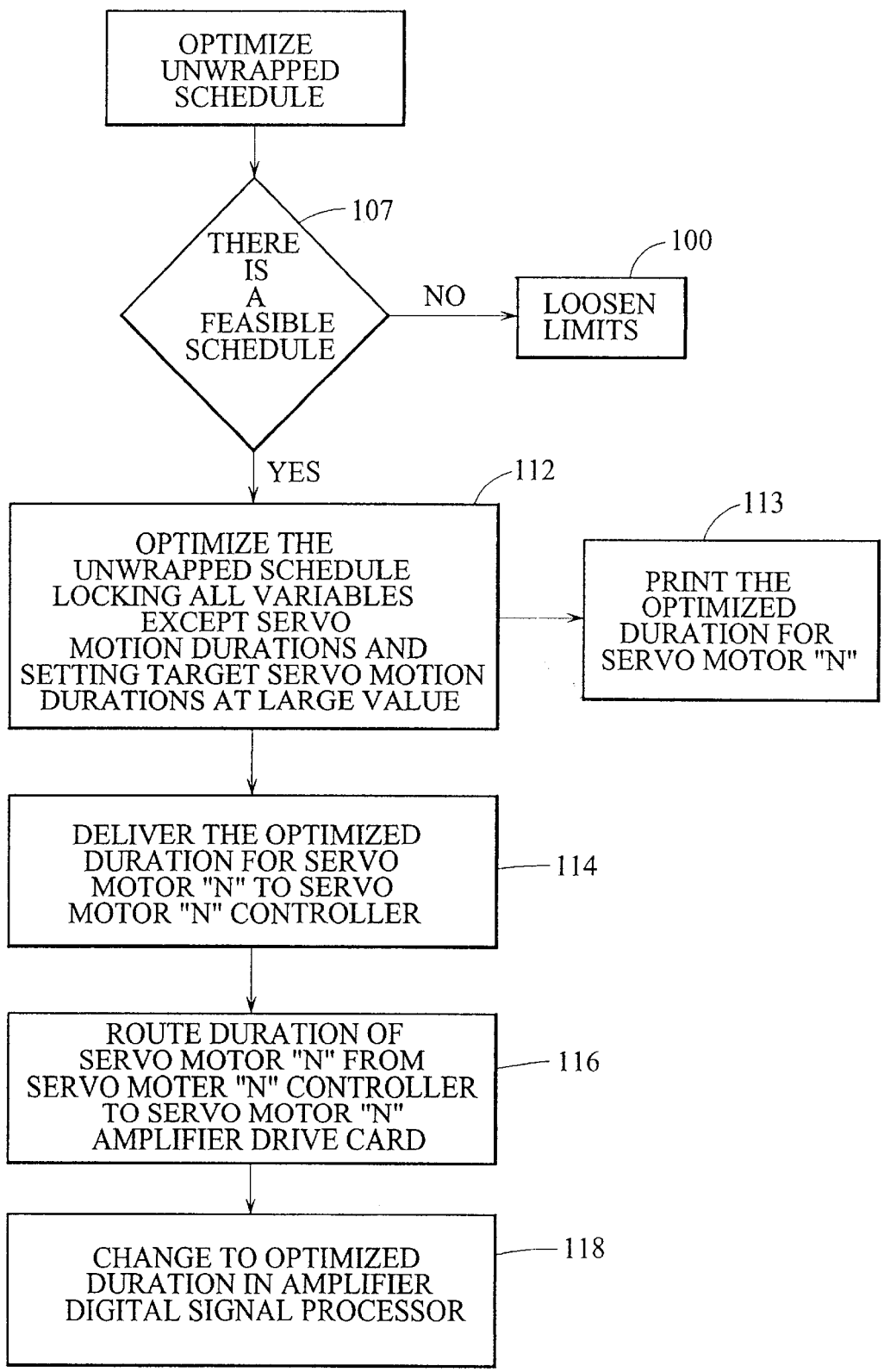
FIG. 21 is a logic diagram illustrating the operation of a control using the computerized model to minimize the wear on the displaceable mechanisms.

FIG. 21 illustrates the use of this technology to optimize the wear on a mechanism operated by a servomotor (Wear Optimization). Here the Computerized Model 64 is used to optimize an unwrapped schedule and when There Is A Solution 107, the next step is for the computer model to Optimize The Unwrapped Schedule Locking All Variables Except Servo Motion Durations And Setting Target Servo Motion Durations At Large Value. 112. The next step is for the computer model to print The Optimized Duration For Servo Motor "N:" and to Deliver The Optimized Duration For Servo Motor "N" To Servo Motor "N" Controller 114, which will then Route Duration Of Servo Motor "N" From Servo "N" Controller To Servo "N" Amplifier Drive Card 116 which will then Change To Optimized Duration In Amplifier Digital Signal Processor 118. The Amplifier Digital Signal Processor could, for example, scale a normalized motion profile for the mechanism to be driven to accommodate any duration of motion. In this environment, an ideal motor to adjust in this fashion is a servomotor which has a normalized motion profile that could be scaled from a minimum duration to a maximum duration. While the preferred embodiment of profiled activator is a servo motor, other electronic motors, such as a stepping motor, could be used.

The disclosed control can be used with a glass forming machine either directly as a part of the machine control or indirectly as a control of a machine which is virtually operated for evaluation purposes.

What is claimed is:

1. A control for a glass forming machine which includes a blank station for forming a parison from a gob of molten glass having a number of mechanisms, a blow station for forming a parison into a bottle, having a number of mechanisms, a feeder system including a shear mechanism for delivering a gob to the blank station, a mechanism for transferring a parison from the blank station to the blow station and a takeout mechanism for removing a bottle from the blank station, wherein the glass forming machine has a set machine cycle having a set machine cycle time, wherein each of the mechanisms is cycled within the time of one machine cycle, wherein the duration of each displacement of each of the mechanisms is determinable, wherein interferences exist between the motion paths of the gob, the parison, the bottle and individual mechanisms, wherein the displacement of at least one of the mechanisms is divided up into at least two submotions which locates an interference with the gob, the parison, the bottle or another mechanism, wherein the thermal forming of the parison and bottle involve a number of thermal forming processes occurring during the time of one machine cycle and having finite durations, wherein process air is supplied for at least one process for a finite duration by turning a supply valve "on" and then "off" during the time of one machine cycle, wherein an unwrapped bottle forming process wherein a gob of molten glass is sheared from a runner of molten glass, the gob is then formed into a parison in the blank station, the parison is then formed into a bottle in the blow station, and the bottle is then removed from the blow station, takes more than the time of one machine cycle to complete, and wherein the start of advancement or retraction for each mechanism and the turning of a supply valve "on" and then "off" are controlled events which are started in a predetermined sequence, comprising a computerized model of a mathematical representation of a network constraint diagram of the unwrapped bottle forming process and computer analysis means for analyzing said the computerized model as a constrained optimization problem for determining, with inputs including the following target inputs:
1. the motion durations,
2. the submotion durations,
3, the machine cycle time,
4. the event time in an unwrapped bottle forming process for each displacement to begin and for each valve to be turned "on" and "off", and
5. the thermal forming process times for the thermal processes, and including the following additional inputs:
1. Motion Duration "N" Limits,
2. Thermal Forming Process Duration "N" Limits,
3. Collision Branch "N" Limits,
4. Sequence Branch "N" Limits, whether there is a feasible optimized unwrapped bottle forming process and machine cycle time and the event time in the feasible schedule for each displacement to begin and for each valve to be turned "on" and "off".

2. A control for a glass forming machine according to claim 1, further comprising input means for defining
1. the motion durations,
2. the submotion durations,
3, the machine cycle time,
4. the event time for each displacement to begin and for each valve to be turned "on" and "off"
5. the duration of each thermal forming process.

3. A control for a glass forming machine according to claim 2, wherein said input means further comprises means for defining:
1. the maximum and/or minimum duration of the thermal forming process,
2. the maximum and/or minimum duration for the motions,
3. the maximum and/or minimum duration for the submotions, and
4. the maximum and/or minimum duration the sequences.

4. A control for defining data for setting the times for controlled events in for a glass forming machine according to claim 1, further comprising wrapping means for wrapping the event time in the feasible optimized schedule for each displacement to begin and for each valve to be turned "on" and "off" into event angles in a 360° machine cycle.

5. A control for a glass forming machine according to claim 3, wherein said input means comprises an operator terminal.

6. A control for use with a machine which receives an initial product and transforms the initial product into a final product in a plurality of stations, wherein the machine has a set machine cycle time, wherein there is at least one mechanism at each station, wherein each of the mechanisms is displaced from an advanced position to a retracted position and from the retracted position back to the advanced position during the time of one machine cycle, wherein the duration of each displacement of each of the mechanisms is determinable, wherein the start of each displacement is an event which is selectively actuated in a selected sequence, and wherein the operation of the machine has a number of constraints including interferences which exist between the motion paths of individual mechanisms, the start and end times and the durations of displacement of the mechanisms, wherein an unwrapped process wherein the initial product is transformed into the final product takes more than the time of one machine cycle to complete, wherein at least one displacement of at least one of the mechanisms is divided up into at least two submotions which locates an interference, comprising a computerized model of a mathematical representation of a network constraint diagram of the unwrapped process, and computer analysis means for analyzing said the computerized model as a constrained optimization problem for determining, with inputs including the following target inputs:
1. the motion durations,
2. the submotion durations,
3. the machine cycle time,
4. the event time in an unwrapped process for each displacement to begin, and and including the following additional inputs:
1. Motion Duration "N" Limits,
2. Collision Branch "N" Limits,
3. Sequence Branch "N" Limits, whether there is a feasible optimized unwrapped process and machine cycle time and the event time in the feasible schedule for each displacement to begin.

7. A control for use with a machine according to claim 6, wherein said mathematical representation comprises a mathematical matrix.

8. A control for use with a glass forming machine according to claim 6, wherein, said computerized model means further comprises means for calculating collision margins for each pair of interfering paths.

* * * * *